US011860057B2

United States Patent
Li et al.

(10) Patent No.: US 11,860,057 B2
(45) Date of Patent: Jan. 2, 2024

(54) HETERODYNE ONE-DIMENSIONAL GRATING MEASURING DEVICE AND MEASURING METHOD THEREOF

(71) Applicant: CHANGCHUN INSTITUTE OF OPTICS, FINE MECHANICS AND PHYSICS, CHINESE ACADEMY OF SCIENCES, Changchun (CN)

(72) Inventors: Wenhao Li, Changchun (CN); Zhaowu Liu, Changchun (CN); Wei Wang, Changchun (CN); Hongzhu Yu, Changchun (CN); Rigalantu Ji, Changchun (CN); Xuefeng Yao, Changchun (CN)

(73) Assignee: CHANGCHUN INSTITUTE OF OPTICS, FINE MECHANICS AND PHYSICS, CHINESE ACADEMY OF SCIENCES, Changchun (CN)

( * ) Notice: Subject to any disclaimer, the term of this patent is extended or adjusted under 35 U.S.C. 154(b) by 47 days.

(21) Appl. No.: 17/710,967

(22) Filed: Mar. 31, 2022

(65) Prior Publication Data
US 2022/0221372 A1 Jul. 14, 2022

Related U.S. Application Data

(63) Continuation of application No. PCT/CN2020/128528, filed on Nov. 13, 2020.

(30) Foreign Application Priority Data

Sep. 11, 2020 (CN) .......................... 202010953595.8
Sep. 11, 2020 (CN) .......................... 202010953635.9
Sep. 11, 2020 (CN) .......................... 202010953637.8

(51) Int. Cl.
*G01M 11/02* (2006.01)
*G01B 9/02003* (2022.01)

(52) U.S. Cl.
CPC ..... *G01M 11/0207* (2013.01); *G01B 9/02003* (2013.01); *G01B 2290/70* (2013.01)

(58) Field of Classification Search
CPC ............ G01B 9/02003; G01B 2290/70; G01D 5/266; G01D 5/268; G01D 5/38
See application file for complete search history.

(56) References Cited

U.S. PATENT DOCUMENTS 9,030,661 B1    5/2015  Mieher et al.
9,140,537 B2 *  9/2015  de Groot ................ G01D 5/266
(Continued)

FOREIGN PATENT DOCUMENTS

CN    102353327 A    2/2012
CN    102944176 A    2/2013
(Continued)

OTHER PUBLICATIONS

International Search Report issued in corresponding International application No. PCT/CN2020/128528, dated Jun. 15, 2021.
(Continued)

*Primary Examiner* — Michael A Lyons

(57) ABSTRACT

A heterodyne one-dimensional grating measuring device and measuring method thereof, including a light source, a reading head, a photoelectric receiving module, and a signal processing system. The light source is configured to generate two linearly polarized lights having characteristics of overlapping, polarization orthogonal, and fixed frequency difference. The reading head is configured to receive two beams of polarized lights and be respectively incident on a surface of a moving measuring grating to generate a +1-order diffracted light and a −1-order diffracted light. The photoelectric receiving module is configured to receive the +1-order diffracted light and the −1-order diffracted light to form two paths of beat frequency signals. The signal processing system is configured to perform differential calcu-
(Continued)

lation on the two paths of the beat frequency signals to realize a displacement measurement of single diffraction of the measuring grating for four-fold optical subdivision.

20 Claims, 7 Drawing Sheets

(56) References Cited

U.S. PATENT DOCUMENTS

| | | | | |
|---|---|---|---|---|
| 9,879,979 | B2* | 1/2018 | Zhang | G01B 9/02007 |
| 11,307,018 | B2* | 4/2022 | Zhu | G01B 11/0675 |
| 2016/0138903 | A1* | 5/2016 | Zhang | G01B 11/14 |
| | | | | 356/488 |
| 2019/0310072 | A1* | 10/2019 | Wu | G01D 5/266 |
| 2022/0228890 | A1* | 7/2022 | Li | G02B 27/285 |

FOREIGN PATENT DOCUMENTS

| | | |
|---|---|---|
| CN | 103604375 A | 2/2014 |
| CN | 103759656 A | 4/2014 |
| CN | 104634254 A | 5/2015 |

OTHER PUBLICATIONS

Written Opinion of the International Searching Authority for No. PCT/CN2020/128528, dated Jun. 15, 2021.

* cited by examiner

Generating two beams of linearly polarized lights having characteristics of overlapping, polarization orthogonal, and fixed frequency difference through a light source, where the two beams of linearly polarized lights are respectively a first polarized light having a frequency of fA and a second polarized light having a frequency of fB, the first polarized light is S polarized light, and the second polarized light is P polarized light — S1

Respectively entering the first polarized light and the second polarized light into a reading head, refracting the first polarized light and the second polarized light through the reading head, and respectively incidenting the first polarized light and the second polarized light on a surface of an one-dimensional measuring grating to generate +1-order diffracted light and -1-order diffracted light where both the +1-order diffracted light and the -1-order diffracted light comprise a first polarized light component and a second polarized light component; then respectively incidenting the +1-order diffracted light and the -1-order diffracted light to a photoelectric receiving module through the reading head — S2

Receiving the +1-order diffracted light and the -1-order diffracted light through the photoelectric receiving module, interfering the second polarized light component of the -1-order diffracted light with the first polarized light component of the +1-order diffracted light to form a beat frequency signal having a frequency of fB-fA, and interfering the first polarized light component of the -1-order diffracted light with the second polarized light component of the +1-order diffracted light to form a beat frequency signal having a frequency of fB-fA — S3

Performing differential calculation on two paths of the beat frequency signals through a signal processing system to realize a displacement measurement of single diffraction of the one-dimensional measuring grating for four-fold optical subdivision — S4

FIG. 6

| Generating two beams of linearly polarized lights having characteristics of overlapping, polarization orthogonal, and fixed frequency difference through a light source, where the two beams of linearly polarized lights are respectively a first polarized light having a frequency of fA and a second polarized light having a frequency of fB, the first polarized light is S polarized light, and the second polarized light is P polarized light | S1 |

| Respectively entering the first polarized light and the second polarized light into a reading head, refracting the first polarized light and the second polarized light through the reading head, and respectively incidenting the first polarized light and the second polarized light on a surface of an one-dimensional measuring grating to generate +1-order diffracted light and -1-order diffracted light where both the +1-order diffracted light and the -1-order diffracted light comprise a first polarized light component and a second polarized light component; then respectively incidenting the +1-order diffracted light and the -1-order diffracted light to a photoelectric receiving module through the reading head | S2 |

| Receiving the +1-order diffracted light and the -1-order diffracted light through the photoelectric receiving module, interfering the second polarized light component of the -1-order diffracted light with the first polarized light component of the +1-order diffracted light to form a beat frequency signal having a frequency of fB-fA, and interfering the first polarized light component of the -1-order diffracted light with the second polarized light component of the +1-order diffracted light to form a beat frequency signal having a frequency of fB-fA | S3 |

| Performing differential calculation on two paths of the beat frequency signals through a signal processing system to realize a displacement measurement of single diffraction of the one-dimensional measuring grating for four-fold optical subdivision | S4 |

FIG. 10

HETERODYNE ONE-DIMENSIONAL GRATING MEASURING DEVICE AND MEASURING METHOD THEREOF

TECHNICAL FIELD

The present disclosure relates to a related field of precision displacement measurement, and in particular to a heterodyne one-dimensional grating measuring device and measuring method thereof, based on single diffraction, to realize four-fold optical subdivision.

BACKGROUND

A grating displacement measuring system uses a grating as a measuring scale, and the grating displacement measuring system uses a grating pitch as a measuring reference. Compared with a laser measuring technology, sensitivity of a grating measuring technology to an environment change is low, and light beams are incident on the grating to cover a plurality of etching grooves, so that an averaging effect is achieved. A structure of a reading head in the grating displacement measuring system is simple and compact, a distance between the grating and the reading head is small, and the distance between the grating and the reading head may not increase along with increasing of a measured distance, which greatly reduces environmental influence on measuring accuracy of the system and measuring cost. With improvement of a grating manufacturing level, the measuring accuracy and a measuring resolution of the grating displacement measuring system are gradually improved, and application range is wider and wider.

The measuring resolution of the grating displacement measuring technology is directly related to the grating pitch. The displacement measuring technology based on a diffracted light interference principle adopts a diffraction grating having high density of grating grooves to achieve a high-resolution and high-accuracy displacement measurement. Optical subdivision and electronic subdivision are main ways to further improve the measuring resolution. Compared with the electronic subdivision, the optical subdivision has higher reliability. A conventional grating displacement measuring system realizes two-fold optical subdivision through adopting single diffraction. In order to further improve the optical subdivision, prior art adopts a secondary diffraction principle to realize four-fold optical subdivision or a multiple diffraction to achieve higher times of optical subdivision. However, the secondary diffraction and the multiple diffraction make an optical structure of the measuring system more complex, the multiple diffraction uses diffracted lights at different positions of the grating, and a surface accuracy of the grating and an attitude error between the grating and the reading head have a great influence on the measuring accuracy.

SUMMARY

The present disclosure aims to overcome defects in prior art and adopt following technical schemes:

The present disclosure provides a heterodyne one-dimensional grating measuring device, including a light source, a reading head, a photoelectric receiving module, and a signal processing system. The light source is configured to generate two beams of linearly polarized lights having characteristics of overlapping, polarization orthogonal, and fixed frequency difference. The two beams of linearly polarized lights are respectively a first polarized light having a frequency of $f_A$ and a second polarized light having a frequency of $f_B$, the first polarized light is S polarized light, and the second polarized light is P polarized light. The reading head is configured to receive the first polarized light and the second polarized light, the first polarized light and the second polarized light are respectively incident on a surface of a moving one-dimensional measuring grating to generate a +1-order diffracted light and a −1-order diffracted light, both the +1-order diffracted light and the −1-order diffracted light include a first polarized light component and a second polarized light component, and the +1-order diffracted light and the −1-order diffracted light are respectively incident to the photoelectric receiving module through the reading head. The photoelectric receiving module is configured to receive the +1-order diffracted light and the −1-order diffracted light to form two paths of beat frequency signals. One path is a beat frequency signal having a frequency of $f_B - f_A$ where the beat frequency having the frequency of $f_B - f_A$ is formed by interfering the second polarized light component of the −1-order diffracted light with the first polarized light component of the +1-order diffracted light, and another path is a beat frequency signal having the frequency of $f_B - f_A$ where the beat frequency signal having the frequency of $f_B - f_A$ is formed by interfering the first polarized light component of the −1-order diffracted light with the second polarized light component of the +1-order diffracted light. The signal processing system is configured to perform differential calculation on the two paths of the beat frequency signals to realize a displacement measurement of single diffraction of the one-dimensional measuring grating for four-fold optical subdivision.

Optionally, the reading head includes a reflecting mirror, a polarized beam splitting prism, a first quarter wave plate, a second quarter wave plate, a compensating mirror plated with a reflecting film, a reflecting prism, and a refracting element. The reflecting mirror is disposed on an emergent light path of the light source, and the reflecting mirror is configured to vertically reflect the first polarized light and the second polarized light to the surface of the one-dimensional measuring grating, so as to generate the +1-order diffracted light and the −1-order diffracted light. The refracting element is disposed on a diffracted light path of the one-dimensional measuring grating, and the refracting element is configured to refract the +1-order diffracted light and the −1-order diffracted light, so that the +1-order diffracted light and the −1-order diffracted light are parallel to each other and are vertically incident to the polarized beam splitting prism. The polarized beam splitting prism is disposed on a transmission light path of the refracting element, the polarized beam splitting prism is configured to respectively reflect the first polarized light component of the +1-order diffracted light and the first polarized light component of the −1-order diffracted light to the first quarter wave plate, and the polarized beam splitting prism is further configured to respectively transmit the second polarized light component of the +1-order diffracted light and the second polarized light component of the −1-order diffracted light to the second quarter wave plate. The first quarter wave plate is disposed on a reflected light path of the polarized beam splitting prism, the first quarter wave plate is configured to respectively convert the first polarized light component of the +1-order diffracted light and the first polarized light component of the −1-order diffracted light into left-handed polarized light, and then the left-handed polarized light is incident to the reflecting prism. The reflecting prism is disposed on a transmission light path of the first quarter wave plate. The reflecting prism is configured to respectively perform secondary reflection on the first polarized light component of the +1-order diffracted light and the first polarized light component of the −1-order diffracted light, so that the first polarized light component of the +1-order diffracted light and the first polarized light component of the −1-order diffracted light become the P polarized light after passing through the first quarter wave plate, and then the P polarized light is incident to the polarized beam splitting prism. The second quarter plate is disposed on a transmission light path of the polarized beam splitting prism, the second quarter plate is configured to respectively convert the second polarized light component of the +1-order diffracted light and the second polarized light component of the −1-order diffracted light into right-handed polarized light, and then the right-handed polarized light is incident to the compensating mirror. The compensating mirror is disposed on a transmission light path of the second quarter wave plate. The compensating mirror is configured to reflect the second polarized light component of the +1-order diffracted light and the second polarized light component of the −1-order diffracted light, so that the second polarized light component of the +1-order diffracted light and the second polarized light component of the −1-order diffracted light become the S polarized light after passing through the second quarter wave plate, and then the S polarized light is incident to the polarized beam splitting prism. The polarized beam splitting prism is further configured to transmit the first polarized light component of the +1-order diffracted light and the first polarized light component of the −1-order diffracted light to the photoelectric receiving module after the first polarized light component of the +1-order diffracted light and the first polarized light component of the −1-order diffracted light become the P polarized light. The polarized beam splitting prism is further configured to reflect the second polarized light component of the +1-order diffracted light and the second polarized light component of the −1-order diffracted light to the photoelectric receiving module after the second polarized light component of the +1-order diffracted light and the second polarized light component of the −1-order diffracted light become the S polarized light.

Optionally, the photoelectric receiving module includes a first receiver and a second receiver. The first receiver is configured to receive the second polarized light component of the −1-order diffracted light and the first polarized light component of the +1-order diffracted light, generate a beat frequency signal having a frequency of $f_B$-$f_A$, and transmit the beat frequency signal to the signal processing system. The second receiver is configured to receive the first polarized light component of the −1-order diffracted light and the second polarized light component of the +1-order diffracted light, generate a beat frequency signal having the frequency of $f_B$-$f_A$, and transmit the beat frequency signal to the signal processing system.

Optionally, when the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$−2Δf, and the frequency of the beat frequency signal generated by the second receiver becomes $f_B$-$f_A$+2Δf.

Optionally, a thickness of the compensating mirror is equal to ½ length of the reflecting prism. The compensating mirror is configured to compensate a transmission optical path of the second polarized light component of the +1-order diffracted light and the second polarized light component of the −1-order diffracted light, so that the transmission optical path of the second polarized light component of the +1-order diffracted light and the second polarized light component of the −1-order diffracted light is equal to a transmission optical path of the first polarized light component of the +1-order diffracted light and the first polarized light component of the −1-order diffracted light.

Optionally, the reading head further includes a first right-angle prism and a second right-angle prism. The first right-angle prism and the second right-angle prism are respectively disposed on the diffracted light paths of the one-dimensional measuring grating. The first right-angle prism and the second right-angle prism respectively perform secondary reflection on the +1-order diffracted light and the −1-order diffracted light, so that the +1-order diffracted light and the −1-order diffracted light are incident on the surface of the one-dimensional measuring grating again at a diffracted exit angle. Two beams of new diffracted light are vertically incident to the polarized beam splitting prism.

Optionally, the reading head includes a polarized beam splitting prism, a first quarter wave plate, a second quarter wave plate plated with a reflecting film, and a reflecting prism. The polarized beam splitting prism is disposed on an emergent light path of the light source. The polarized beam splitting prism is configured to receive the first polarized light and the second polarized light, transmit the second polarized light to the first quarter wave plate, and reflect the first polarized light to the second quarter wave plate. The first quarter wave plate is disposed on a transmission light path of the polarized beam splitting prism. The first quarter wave plate is configured to convert the second polarized light into right-handed polarized light, and then the right-handed polarized light is incident to the reflecting prism. The reflecting prism is disposed on a transmission light path of the first quarter wave plate. The reflecting prism is configured to reflect the second polarized light, so that the second polarized light passes through the first quarter wave plate to become S polarized light and then returns to the polarized beam splitting prism. The second quarter wave plate is disposed on a reflected light path of the polarized beam splitting prism, and the second quarter wave plate is configured to convert the first polarized light into left-handed polarized light. The left-handed polarized light is reflected through the reflecting film, passes through the second quarter wave plate again to become P polarized light, and then returns to the polarized beam splitting prism. The polarized beam splitting prism is further configured to transmit the first polarized light after the first polarized light becomes the P polarized light, reflect the second polarized light after the second polarized light becomes the S polarized light, so that the first polarized light and the second polarized light are combined into one beam to be incident on the surface of the one-dimensional measuring grating, and the one beam combined of the first polarized light and the second polarized light is diffracted to generate the −1-order diffracted light and the +1-order diffracted light.

Optionally, the reading head further includes a refracting element and a third quarter wave plate. The refracting element is disposed on a diffracted light path of the one-dimensional measuring grating. The refracting element is configured to refract the −1-order diffracted light and the +1-order diffracted light, so that the −1-order diffracted light and the +1-order diffracted light are parallel to each other and are vertically incident to the third quarter wave plate. The third quarter wave plate is disposed on a transmission light path of the refracting element. The third quarter wave plate is configured to convert the first polarized light component of the +1-order diffracted light and the first polarized light component of the −1-order diffracted light into the S polarized light, and the S polarized light is vertically incident to the polarized beam splitting prism. The third quarter wave plate is further configured to convert the second polarized light component of the +1-order diffracted light and the second polarized light component of the −1-order diffracted light into the P polarized light, and the P polarized light is vertically incident to the polarized beam splitting prism. The polarized beam splitting prism is configured to reflect the first polarized light component of the +1-order diffracted light and the first polarized light component of the −1-order diffracted light to the first quarter wave plate. The polarized beam splitting prism is further configured to transmit the second polarized light component of the +1-order diffracted light and the second polarized light component of the −1-order diffracted light to the second quarter wave plate. The first quarter wave plate is configured to convert the first polarized light component of the +1-order diffracted light and the first polarized light component of the −1-order diffracted light into the left-handed polarized light, and then the left-handed polarized light is incident to the reflecting prism. The reflecting prism is configured to perform secondary reflection on the first polarized light component of the +1-order diffracted light and the first polarized light component of the −1-order diffracted light to the first quarter wave plate to become the P polarized light, and then the P polarized light is incident to the polarized beam splitting prism again and is transmitted to the photoelectric receiving module through the polarized beam splitting prism. The second quarter wave plate is configured to convert the second polarized light component of the +1-order diffracted light and the second polarized light component of the −1-order diffracted light into the right-handed polarized light, then the right-handed polarized light is reflected through the reflecting film again and passes through the second quarter wave plate to become the S polarized light, and the S polarized light is incident to the polarized beam splitting prism and then is reflected to the photoelectric receiving module through the polarized beam splitting prism.

Optionally, the photoelectric receiving module includes a first receiver and a second receiver. The first receiver is configured to receive the first polarized light component of the +1-order diffracted light and the second polarized light component of the −1-order diffracted light, generate a beat frequency signal having a frequency of $f_B$-$f_A$, and transmit the beat frequency signal to the signal processing system. The second receiver is configured to receive the first polarized light component of the −1-order diffracted light and the second polarized light component of the +1-order diffracted light, generate a beat frequency signal having the frequency of $f_B$-$f_A$, and transmit the beat frequency signal to the signal processing system.

Optionally, when the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$-2Δf, and the frequency of the beat frequency signal generated by the second receiver becomes $f_B$-$f_A$+2Δf.

Optionally, a transmission optical path of the first polarized light component of the −1-order diffracted light is equal to a transmission optical path of the second polarized light component of the −1-order diffracted light, and a transmission optical path of the first polarized light component of the +1-order diffracted light is equal to a transmission optical path of the second polarized light component of the +1-order diffracted light.

Optionally, the reading head further includes a first right-angle prism and a second right-angle prism. The first right-angle prism and the second right-angle prism are respectively disposed on the diffracted light paths of the one-dimensional measuring grating. The first right-angle prism and the second right-angle prism respectively perform secondary reflection on the +1-order diffracted light and the −1-order diffracted light, so that the +1-order diffracted light and the −1-order diffracted light are incident on the surface of the one-dimensional measuring grating again at a diffracted exit angle, and two beams of new diffracted light are vertically incident to the polarized beam splitting prism.

The present disclosure further provides a heterodyne one-dimensional grating measuring method, including the following steps:

S1: generating two beams of linearly polarized lights having characteristics of overlapping, polarization orthogonal, and fixed frequency difference through a light source, where the two beams of linearly polarized lights are respectively a first polarized light having a frequency of $f_A$ and a second polarized light having a frequency of $f_B$, the first polarized light is S polarized light, and the second polarized light is P polarized light.

S2: respectively entering the first polarized light and the second polarized light into a reading head, refracting the first polarized light and the second polarized light through the reading head, and respectively incidenting the first polarized light and the second polarized light on a surface of an one-dimensional measuring grating to generate +1-order diffracted light and −1-order diffracted light, both the +1-order diffracted light and the −1-order diffracted light include a first polarized light component and a second polarized light component, then respectively incidenting the +1-order diffracted light and the −1-order diffracted light to a photoelectric receiving module through the reading head.

S3: receiving the +1-order diffracted light and the −1-order diffracted light through the photoelectric receiving module, interfering the second polarized light component of the −1-order diffracted light with the first polarized light component of the +1-order diffracted light to form a beat frequency signal having a frequency of $f_B$-$f_A$, and interfering the first polarized light component of the −1-order diffracted light with the second polarized light component of the +1-order diffracted light to form a beat frequency signal having the frequency of $f_B$-$f_A$.

S4: performing differential calculation on two paths of the beat frequency signals through a signal processing system to realize a displacement measurement of single diffraction of the one-dimensional measuring grating for four-fold optical subdivision.

Optionally, the step S2 includes the following steps:

S201: vertically reflecting the first polarized light and the second polarized light to the surface of the one-dimensional measuring grating through a reflecting mirror of the reading head, then generating the +1-order diffracted light and the −1-order diffracted light.

S202: refracting the +1-order diffracted light and the −1-order diffracted light through a refracting element of the reading head, so that the +1-order diffracted light and the −1-order diffracted light are parallel to each other and are vertically incident to a polarized beam splitting prism of the reading head.

S203: respectively reflecting the first polarized light component of the +1-order diffracted light and the first polarized light component of the −1-order diffracted light to a first quarter wave plate of the reading head through the polarized beam splitting prism, respectively transmitting the second polarized light component of the +1-order diffracted light and the second polarized light component of the −1-order diffracted light to a second quarter wave plate of the reading head through the polarized beam splitting prism.

S204: respectively converting the first polarized light component of the +1-order diffracted light and the first polarized light component of the −1-order diffracted light into left-handed polarized light through the first quarter wave plate, and then incidenting the left-handed polarized light to a reflecting prism of the reading head, respectively perform secondary reflection on the first polarized light component of the +1-order diffracted light and the first polarized light component of the −1-order diffracted light through the reflecting prism, so that the first polarized light component of the +1-order diffracted light and the first polarized light component of the −1-order diffracted light become the P polarized light after passing through the first quarter wave plate, and then incidenting the P polarized light to the polarized beam splitting prism, respectively converting the second polarized light component of the +1-order diffracted light and the second polarized light component of the −1-order diffracted light into right-handed polarized light through the second quarter plate, and then incidenting the right-handed polarized light to a compensating mirror of the reading head, reflecting the second polarized light component of the +1-order diffracted light and the second polarized light component of the −1-order diffracted light through the compensating mirror, so that the second polarized light component of the +1-order diffracted light and the second polarized light component of the −1-order diffracted light become the S polarized light after passing through the second quarter wave plate, and then incidenting the S polarized light to the polarized beam splitting prism.

S205: transmitting the first polarized light component of the +1-order diffracted light and the first polarized light component of the −1-order diffracted light to the photoelectric receiving module through the polarized beam splitting prism after the first polarized light component of the +1-order diffracted light and the first polarized light component of the −1-order diffracted light become the P polarized light, reflecting the second polarized light component of the +1-order diffracted light and the second polarized light component of the −1-order diffracted light to the photoelectric receiving module through the polarized beam splitting prism after the second polarized light component of the +1-order diffracted light and the second polarized light component of the −1-order diffracted light become the S polarized light.

Optionally, a thickness of the compensating mirror is equal to ½ length of the reflecting prism. The compensating mirror is configured to compensate a transmission optical path of the second polarized light component of the +1-order diffracted light and the second polarized light component of the −1-order diffracted light, so that the transmission optical path of the second polarized light component of the +1-order diffracted light and the second polarized light component of the −1-order diffracted light is equal to a transmission optical path of the first polarized light component of the +1-order diffracted light and the first polarized light component of the −1-order diffracted light.

Optionally, the step S2 specifically includes the following steps:

S201': incidenting the first polarized light and the second polarized light to a polarized beam splitting prism of the reading head, transmitting the second polarized light to a first quarter wave plate of the reading head through the polarized beam splitting prism, and reflecting the first polarized light to a second quarter wave plate of the reading head through the polarized beam splitting prism.

S202': converting the second polarized light into right-handed polarized light through the first quarter wave plate, and then incidenting the right-handed polarized light to the reflecting prism. Reflecting the second polarized light through the reflecting prism, so that the second polarized light passes through the first quarter wave plate to become S polarized light and then returns to the polarized beam splitting prism, converting the first polarized light into left-handed polarized light through the second quarter wave plate, reflecting the left-handed polarized light through the reflecting film to pass through the second quarter wave plate again to become P polarized light, and then the P polarized light returns to the polarized beam splitting prism.

S203': further transmitting the first polarized light through the polarized beam splitting prism after the first polarized light becomes the P polarized light, reflecting the second polarized light through the polarized beam splitting prism after the second polarized light becomes the S polarized light, so that the first polarized light and the second polarized light are combined into one beam to be incident on the surface of the one-dimensional measuring grating, and diffracting the one beam combined of the first polarized light and the second polarized light to generate the −1-order diffracted light and the +1-order diffracted light.

S204': refracting the −1-order diffracted light and the +1-order diffracted light through a refracting element of the reading head, so that the −1-order diffracted light and the +1-order diffracted light are parallel to each other and are vertically incident to a third quarter wave plate of the reading head.

S205': converting the first polarized light component of the +1-order diffracted light and the first polarized light component of the −1-order diffracted light into the S polarized light through the third quarter wave plate, and vertically incidenting the S polarized light to the polarized beam splitting prism, converting the second polarized light component of the +1-order diffracted light and the second polarized light component of the −1-order diffracted light into the P polarized light through the third quarter wave plate, and vertically incidenting the P polarized light to the polarized beam splitting prism.

S206': reflecting the first polarized light component of the +1-order diffracted light and the first polarized light component of the −1-order diffracted light to the first quarter wave plate through the polarized beam splitting prism, transmitting the second polarized light component of the +1-order diffracted light and the second polarized light component of the −1-order diffracted light to the second quarter wave plate through the polarized beam splitting prism.

S207': converting the first polarized light component of the +1-order diffracted light and the first polarized light component of the −1-order diffracted light into the left-handed polarized light through the first quarter wave plate, and then incidenting the left-handed polarized light to the reflecting prism, respectively performing secondary reflection on the first polarized light component of the +1-order diffracted light and the first polarized light component of the −1-order diffracted light to the first quarter wave plate to become the P polarized light through the reflecting prism, then incidenting the P polarized light to the polarized beam splitting prism again and transmitting the P polarized light to the photoelectric receiving module through the polarized beam splitting prism, converting the second polarized light component of the +1-order diffracted light and the second polarized light component of the −1-order diffracted light into the right-handed polarized light through the second quarter wave plate, then reflecting the right-handed polarized light through the reflecting film again and passing through the second quarter wave plate to become the S polarized light, incidenting the S polarized light to the polarized beam splitting prism and then reflecting the S polarized light to the photoelectric receiving module through the polarized beam splitting prism.

Optionally, a transmission optical path of the first polarized light component of the −1-order diffracted light is equal to a transmission optical path of the second polarized light component of the −1-order diffracted light. A transmission optical path of the first polarized light component of the +1-order diffracted light is equal to a transmission optical path of the second polarized light component of the +1-order diffracted light.

Optionally, the photoelectric receiving module includes a first receiver and a second receiver. The first receiver receives the second polarized light component of the −1-order diffracted light and the first polarized light component of the +1-order diffracted light, generates a beat frequency signal having a frequency of $f_B$-$f_A$, and transmits the beat frequency signal to the signal processing system. The second receiver receives the first polarized light component of the −1-order diffracted light and the second polarized light component of the +1-order diffracted light, generates a beat frequency signal having the frequency of $f_B$-$f_A$, and transmits the beat frequency signal to the signal processing system.

Optionally, when the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$−2Δf, and the frequency of the beat frequency signal generated by the second receiver becomes $f_B$-$f_A$+2Δf.

Optionally, the +1-order diffracted light and the −1-order diffracted light generated by the diffraction of the one-dimensional measuring grating are respectively incident to the first right-angle prism and the second right-angle prism. The first right-angle prism and the second right-angle prism respectively perform secondary reflection on the +1-order diffracted light and the −1-order diffracted light, so that the +1-order diffracted light and the −1-order diffracted light are incident on the surface of the one-dimensional measuring grating again at a diffracted exit angle. Two beams of new diffracted light are vertically incident to the polarized beam splitting prism.

Compared with the prior art, the present disclosure realizes four-fold optical subdivision through the single diffraction on the surface of the one-dimensional measuring grating, which effectively prevents measuring accuracy from being influenced by grating surface shape accuracy and a grating attitude error. In addition, the heterodyne one-dimensional grating measuring device of the present disclosure is simple in structure, small in size, light in weight, easy in installation, convenient in application, etc. At the same time, the optical subdivision of higher multiples is realized through combining a method of secondary diffraction or multiple diffraction.

BRIEF DESCRIPTION OF DRAWINGS

FIG. 6 is a schematic flowchart of a heterodyne one-dimensional grating measuring method according to embodiment 2 of the present disclosure.

FIG. 10 is a schematic flowchart of a heterodyne one-dimensional grating measuring method according to embodiment 4 of the present disclosure.

Figure 1:
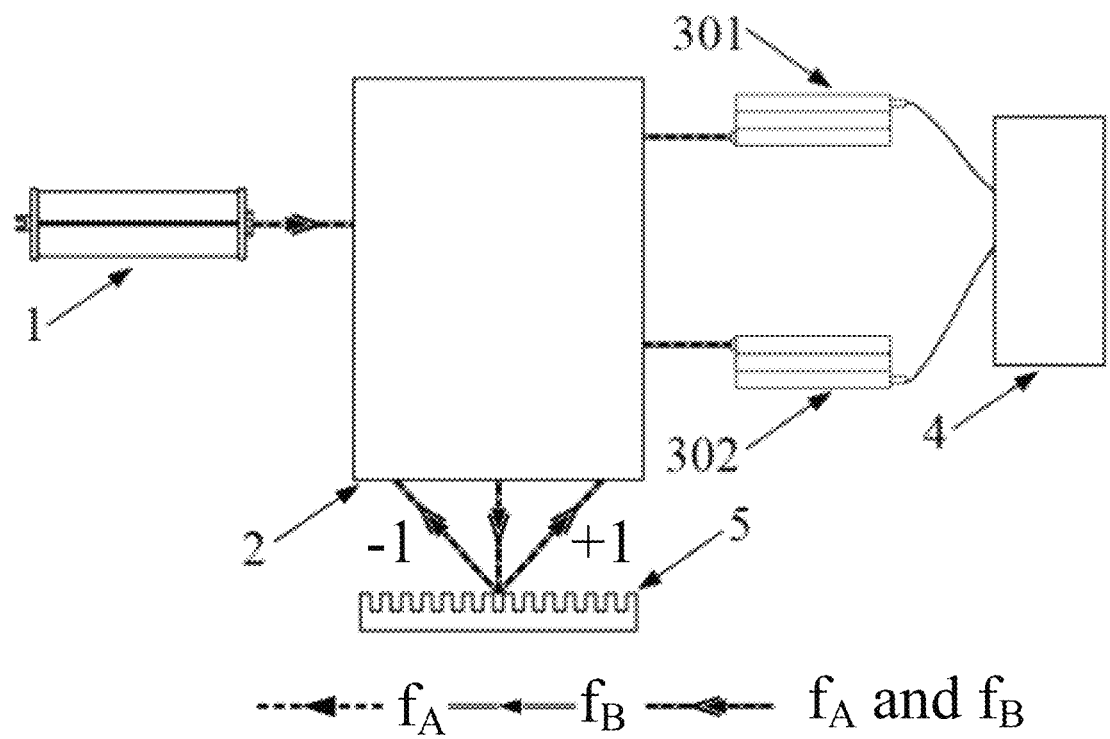
FIG. 1 is a structural schematic diagram of a heterodyne one-dimensional grating measuring device according to embodiment 1 of the present disclosure.
Figure 2:
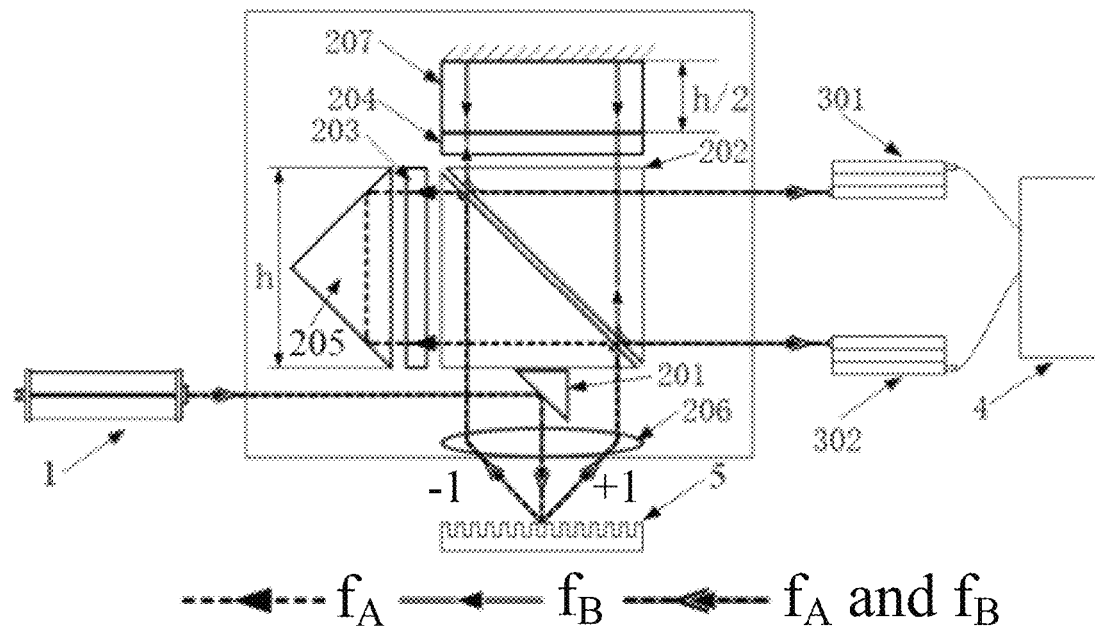
FIG. 2 is a principal schematic diagram of the heterodyne one-dimensional grating measuring device according to embodiment 1 of the present disclosure.
Figure 3:
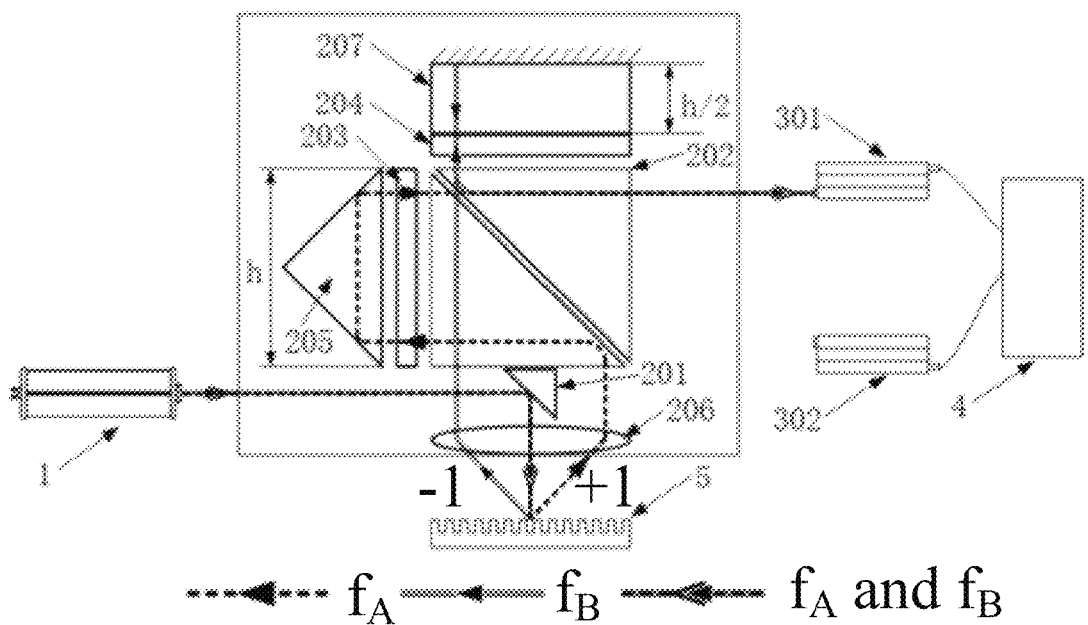
FIG. 3 is a principal schematic diagram of generating a first beat frequency signal according to embodiment 1 of the present disclosure.
Figure 4:
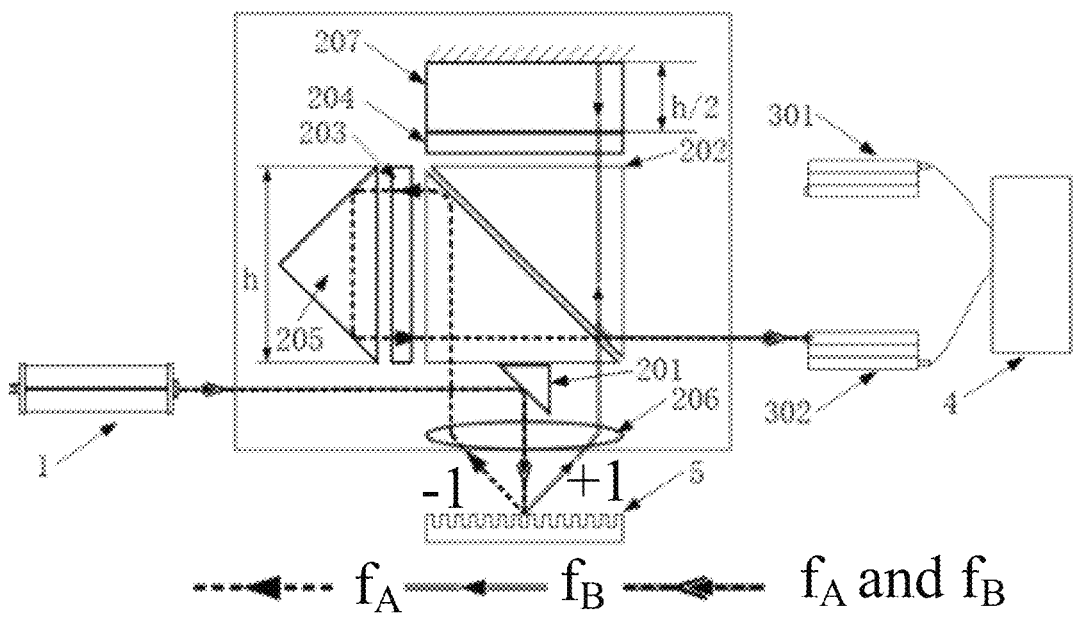
FIG. 4 is a principal schematic diagram of generating a second beat frequency signal according to embodiment 1 of the present disclosure.

Reference numerals in Embodiment 1 include: light source 1; reading head 2; reflecting mirror 201; polarized beam splitting prism 202; first quarter wave plate 203; second quarter wave plate 204; reflecting prism 205; refracting element 206; compensating mirror 207, first right-angle prism 208; second right-angle prism 209; first receiver 301; second receiver 302; signal processing system 4; and measuring grating 5.

The reference numerals in Embodiment 3 include: light source 1'; reading head 2'; polarized beam splitting prism 201'; first quarter wave plate 202'; second quarter wave plate 203'; third quarter wave plate 204'; reflecting prism 205'; refracting element 206; first right-angle prism 207'; second right-angle prism 208'; first receiver 301'; second receiver 302'; signal processing system 4'; and measuring grating 5'.

DETAILED DESCRIPTION

In order to make objectives, technical solutions and advantages of the present disclosure clearer, the present disclosure is further described in detail below with reference to accompanying drawings and specific embodiments. It should be understood that the specific embodiments described herein are only configured to explain the present disclosure, but not to limit the present disclosure.

The present disclosure provides a heterodyne one-dimensional grating measuring device and measuring method thereof, which fixes a one-dimensional measuring grating on an object to be measured to regard as a scale for displacement measurement. When the one-dimensional measuring grating moves along with the object to be measured, the displacement the object is measured through measuring the displacement of the one-dimensional measuring grating.

In order to solve a problem of realizing optical subdivision of four-fold or higher fold in prior art through secondary diffraction or multiple diffraction, an optical structure of a measuring system may become more complex. In addition, the multiple diffraction uses diffracted lights at different positions of a grating, grating surface shape accuracy and a grating attitude error may greatly affect measuring accuracy.

According to the heterodyne one-dimensional grating measuring device and measuring method thereof provided by the present disclosure, a special structural design is carried out on a reading head, so that when two beams of polarized light having a fixed frequency difference emitted by a light source are incident on a surface of the one-dimensional measuring grating through the reading head, a single diffraction achieves four-fold optical subdivision, which prevents the measuring accuracy from being influenced by the grating surface shape accuracy and the grating attitude error. In addition, the reading head in the present disclosure is simple in structure, small in volume, and light in weight, which simplify complexity of the optical structure in the measuring system. The present disclosure may further combine the secondary diffraction or the multiple diffraction to achieve better multiples of optical subdivision.

The heterodyne one-dimensional grating measuring device and measuring method thereof provided by the present disclosure is expanded and described by taking the single diffraction to achieve the four-fold optical subdivision as an example Embodiment 1

As shown in FIGS. 1-4, the present disclosure provides a heterodyne one-dimensional grating measuring device, including a light source 1, a reading head 2, a photoelectric receiving module, and a signal processing system 4. The light source 1 is configured to generate two beams of linearly polarized lights having characteristics of overlapping, polarization orthogonal, and fixed frequency difference as measuring light beams. The two beams of linearly polarized lights are respectively a first polarized light and a second polarized light, the first polarized light is S polarized light having a frequency of $f_A$, and the second polarized light is P polarized light having a frequency of $f_B$. The light source 1 may be a dual-frequency laser 1 or two lasers emitting a fixed frequency difference. The reading head is configured to incident the two beams of polarized lights on the surface of the moving one-dimensional measuring grating 5, the two beams of polarized lights generate a +1-order diffracted light and a −1-order diffracted light carrying measuring information after diffraction on the surface of the one-dimensional measuring grating 5. Both the +1-order diffracted light and the −1-order diffracted light include a first polarized light component and a second polarized light component. The first polarized light component and the second polarized light component of the +1-order diffracted light, and the first polarized light component and the second polarized light component of the −1-order diffracted light are respectively incident to the photoelectric receiving module through the reading head.

The reading head 2 includes a reflecting mirror 201, a polarized beam splitting prism 202, a first quarter wave plate 203, a second quarter wave plate 204, a reflecting prism 205, a refracting element 206, and a compensating mirror 207 plated with a reflecting film. The reflecting mirror 201 is disposed on an emergent light path of the light source 1, the refracting element 206 is disposed on a diffracted light path of the one-dimensional measuring grating 5, the polarized beam splitting prism 202 is disposed on a transmission light path of the refracting element 206, the first quarter wave plate 203 is disposed on a reflected light path of the polarized beam splitting prism 202, the second quarter plate 204 is disposed on a transmission light path of the polarized beam splitting prism 202, the reflecting prism 205 is disposed on a transmission light path of the first quarter wave plate 204, and the compensating mirror 207 is disposed on a transmission light path of the second quarter wave plate 204.

The reflecting mirror 201 vertically reflects the first polarized light and the second polarized light to the surface of the one-dimensional measuring grating 5, so as to generate the +1-order diffracted light and the −1-order diffracted light after diffraction. The +1-order diffracted light and the −1-order diffracted light are parallel to each other and are vertically incident to the polarized beam splitting prism 202 after being turned by the refracting element 206. The polarized beam splitting prism 202 respectively reflects the first polarized light component of the +1-order diffracted light and the first polarized light component of the −1-order diffracted light to the first quarter wave plate 203, and the polarized beam splitting prism further respectively transmits the second polarized light component of the +1-order diffracted light and the second polarized light component of the −1-order diffracted light to the second quarter wave plate 204.

The first quarter wave plate 203 respectively converts the first polarized light component of the +1-order diffracted light and the first polarized light component of the −1-order diffracted light into left-handed polarized light, and then the left-handed polarized light is incident to the reflecting prism 205. The reflecting prism 205 respectively performs secondary reflection on the first polarized light component of the +1-order diffracted light and the first polarized light component of the −1-order diffracted light, so that the first polarized light component of the +1-order diffracted light and the first polarized light component of the −1-order diffracted light become the P polarized light after passing through the first quarter wave plate 203 again, and then the P polarized light is incident to the polarized beam splitting prism 202 again. The polarized beam splitting prism 202 transmits the first polarized light component of the +1-order diffracted light, after the first polarized light component of the +1-order diffracted light becomes the P polarized light, to a first receiver 301. The polarized beam splitting prism 202 further transmits the first polarized light component of the −1-order diffracted light, after the first polarized light component of the −1-order diffracted light becomes the P polarized light, to a second receiver 302.

The second quarter plate 204 respectively converts the second polarized light component of the +1-order diffracted light and the second polarized light component of the −1-order diffracted light into right-handed polarized light, and then the right-handed polarized light is incident to the compensating mirror 207. The second polarized light component of the +1-order diffracted light and the second polarized light component of the −1-order diffracted light are reflected back to the second quarter wave plate 204 through the compensating mirror 207, so that the second polarized light component of the +1-order diffracted light and the second polarized light component of the −1-order diffracted light become the S polarized light, and then the S polarized light is incident to the polarized beam splitting prism. The polarized beam splitting prism 202 reflects the second polarized light component of the +1-order diffracted light, after the second polarized light component of the +1-order diffracted light becomes the S polarized light, to the second receiver 302. The polarized beam splitting prism 202 reflects the second polarized light component of the −1-order diffracted light, after the second polarized light component of the −1-order diffracted light becomes the S polarized light, to the first receiver 301.

Due to a fact that the first polarized light component of the +1-order diffracted light and the first polarized light component of the −1-order diffracted light pass through the reflecting prism 205, and the second polarized light component of the +1-order diffracted light and the second polarized light component of the −1-order diffracted light do not pass through the reflecting prism 205, as a result, transmission optical paths of the first polarized light component and the second polarized light component of the +1-order diffracted light are different from transmission optical paths of the first polarized light component and the second polarized light component of the −1-order diffracted light. Therefore, the transmission optical paths of the second polarized light component of the +1-order diffracted light and the second polarized light component of the −1-order diffracted light are compensated through the compensating mirror 207.

In one specific embodiment of the present disclosure, a thickness of the compensating mirror 207 is equal to ½ length of the reflecting prism 205. The compensating mirror 207 makes the transmission optical path of the second polarized light component of the +1-order diffracted light is incident on the second receiver 302 after passing through the compensating mirror 207 twice, is equal to the transmission optical path of the first polarized light component of the +1-order diffracted light is incident on the first receiver 301 after passing through the reflecting prism 205. The compensating mirror 207 further makes the transmission optical path of the second polarized light component of the −1-order diffracted light is incident on the first receiver 301 after passing through the compensating mirror 207 twice, is equal to the transmission optical path of the first polarized light component of the −1-order diffracted light is incident on the second receiver 302 after passing through the reflecting prism 205. Therefore, the compensating mirror 207 realizes compensation for the transmission optical path of the second polarized light component of the +1-order diffracted light and the second polarized light component of the −1-order diffracted light.

There are two purposes to compensate for the transmission optical paths:

First, it is ensured that an optical path difference of measuring light beams entering the first receiver 301 and the second receiver 302 is a constant value.

Second, when an environment temperature of a heterodyne grating displacement measuring optical system changes, optical path difference changes of the measuring light beam are consistent, so that the measuring light beam may not be influenced by thermal expansion and contraction of optical elements of the reading head, and measuring errors are not introduced.

The photoelectric receiving module includes the first receiver 301 and the second receiver 302. The first receiver 301 is configured to receive the second polarized light component of the −1-order diffracted light and the first polarized light component of the +1-order diffracted light. After the second polarized light component of the −1-order diffracted light interferes with the first polarized light component of the +1-order diffracted light to form a first beat frequency signal having a frequency of $f_B-f_A$, the first receiver 301 transmits the first beat frequency signal to the signal processing system 4. The second receiver 302 is configured to receive the first polarized light component of the −1-order diffracted light and the second polarized light component of the +1-order diffracted light. After the first polarized light component of the −1-order diffracted light interferes with the second polarized light component of the +1-order diffracted light to form a second beat frequency signal having a frequency of $f_B-f_A$, the second receiver 302 transmits the second beat frequency signal to the signal processing system 4.

When the one-dimensional measuring grating 5 moves along a direction of a grating vector, due to Doppler frequency shift effect of the grating, the −1-order diffracted light undergoes negative frequency shift $-\Delta f$, the +1-order diffracted light undergoes forward frequency shift $+\Delta f$. Therefore, the frequency of the first beat frequency signal generated by the first receiver 301 becomes $f_B-f_A-2\Delta f$, and the frequency of the second beat frequency signal generated by the second receiver 302 becomes $f_B-f_A+2\Delta f$.

The signal processing system 4 is configured to receive the first beat frequency signal and the second beat frequency signal sent by the first receiver 301 and the second receiver 302. The signal processing system 4 is further configured to perform differential calculation on the first beat frequency signal and the second beat frequency signal to realize a displacement measurement of the single diffraction of the one-dimensional measuring grating for the four-fold optical subdivision. Since the differential calculation is already in the prior art, details are not described herein.

Figure 5:
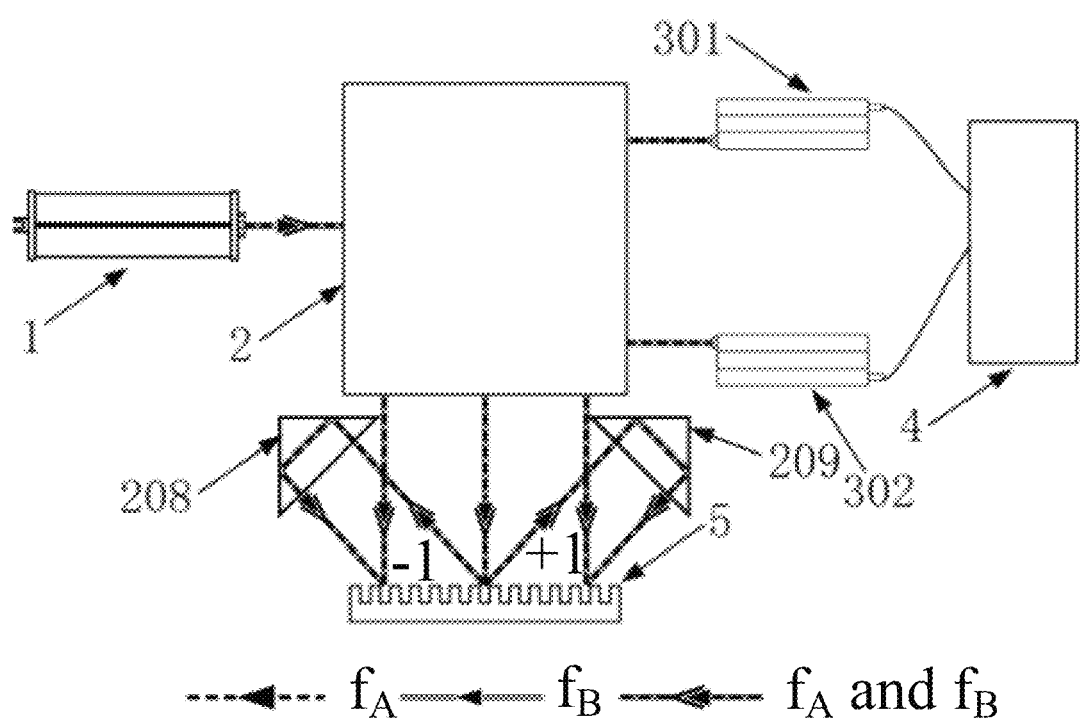
FIG. 5 is a principal schematic diagram of realizing eight-fold optical subdivision through combining secondary diffraction according to embodiment 1 of the present disclosure.

The present disclosure further realizes eight-fold optical subdivision in combination with the secondary diffraction. As shown in FIG. 5, the reading head further includes a first right-angle prism 208 and a second right-angle prism 209. The first right-angle prism 208 and the second right-angle prism 209 are respectively disposed on the diffracted light path of the one-dimensional measuring grating 5.

The first right-angle prism 208 and the second right-angle prism 209 respectively perform secondary reflection on the +1-order diffracted light and the −1-order diffracted light, so that the +1-order diffracted light and the −1-order diffracted light are incident on the surface of the one-dimensional measuring grating 5 again at a diffracted exit angle to generate two beams of new diffracted lights. The two beams of new diffracted light are perpendicularly emitted from the surface of the one-dimensional measurement grating 5 and are perpendicularly incident to the polarized beam splitting prism 202. Through the secondary diffraction of the +1-order diffracted light and the −1-order diffracted light, multiple times of the optical subdivision are doubled, so that measurement resolution force is improved.

Embodiment 2

The embodiment 1 of the present disclosure provides a structure of the heterodyne one-dimensional grating measuring device. Corresponding to the heterodyne one-dimensional grating measuring device of embodiment 1 of the present disclosure, embodiment 2 of the present disclosure provides a method for a grating displacement measurement through using the heterodyne one-dimensional grating measuring device of the embodiment 1.

FIG. 6 is a schematic flowchart of a heterodyne one-dimensional grating measuring method according to embodiment 2 of the present disclosure.

As shown in FIG. 6, the heterodyne one-dimensional grating measuring method according to embodiment 2 of the present disclosure includes following steps:

S1: generating two linearly polarized lights having characteristics of overlapping, polarization orthogonal, and fixed frequency difference through a light source, where the two linearly polarized lights are respectively a first polarized light having a frequency of $f_A$ and a second polarized light having a frequency of $f_B$, the first polarized light is S polarized light, and the second polarized light is P polarized light.

S2: respectively entering the first polarized light and the second polarized light into a reading head, refracting the first polarized light and the second polarized light through the reading head, and respectively incidenting the first polarized light and the second polarized light on a surface of a one-dimensional measuring grating to generate +1-order diffracted light and −1-order diffracted light. Both the +1-order diffracted light and the −1-order diffracted light include a first polarized light component and a second polarized light component, then respectively incidenting the +1-order diffracted light and the −1-order diffracted light to a photoelectric receiving module through the reading head.

The step S2 includes the following steps:

S201: vertically reflecting the first polarized light and the second polarized light to the surface of the one-dimensional measuring grating through a reflecting mirror of the reading head, then generating the +1-order diffracted light and the −1-order diffracted light.

S202: refracting the +1-order diffracted light and the −1-order diffracted light through a refracting element of the reading head, so that the +1-order diffracted light and the −1-order diffracted light are parallel to each other and are vertically incident to a polarized beam splitting prism of the reading head.

S203: respectively reflecting the first polarized light component of the +1-order diffracted light and the first polarized light component of the −1-order diffracted light to a first quarter wave plate of the reading head through the polarized beam splitting prism, respectively transmitting the second polarized light component of the +1-order diffracted light and the second polarized light component of the −1-order diffracted light to a second quarter wave plate of the reading head through the polarized beam splitting prism.

S204: respectively converting the first polarized light component of the +1-order diffracted light and the first polarized light component of the −1-order diffracted light into left-handed polarized light through the first quarter wave plate, and then incidenting the left-handed polarized light to a reflecting prism of the reading head, performing secondary reflection on the first polarized light component of the +1-order diffracted light and the first polarized light component of the −1-order diffracted light through the reflecting prism, so that the first polarized light component of the +1-order diffracted light and the first polarized light component of the −1-order diffracted light become the P polarized light after passing through the first quarter wave plate, and then incidenting the P polarized light to the polarized beam splitting prism. Respectively converting the second polarized light component of the +1-order diffracted light and the second polarized light component of the −1-order diffracted light into right-handed polarized light through the second quarter plate, and then incidenting the right-handed polarized light to a compensating mirror of the reading head. Reflecting the second polarized light component of the +1-order diffracted light and the second polarized light component of the −1-order diffracted light through the compensating mirror, so that the second polarized light component of the +1-order diffracted light and the second polarized light component of the −1-order diffracted light become the S polarized light after passing through the second quarter wave plate, and then incidenting the S polarized light to the polarized beam splitting prism.

A thickness of the compensating mirror is equal to ½ length of the reflecting prism. The compensating mirror is configured to compensate a transmission optical path of the second polarized light component of the +1-order diffracted light and the second polarized light component of the −1-order diffracted light, so that the transmission optical path of the second polarized light component of the +1-order diffracted light and the second polarized light component of the −1-order diffracted light is equal to a transmission optical path of the first polarized light component of the +1-order diffracted light and the first polarized light component of the −1-order diffracted light.

S205: transmitting the first polarized light component of the +1-order diffracted light and the first polarized light component of the −1-order diffracted light to the photoelectric receiving module through the polarized beam splitting prism after the first polarized light component of the +1-order diffracted light and the first polarized light component of the −1-order diffracted light become the P polarized light, reflecting the second polarized light component of the +1-order diffracted light and the second polarized light component of the −1-order diffracted light to the photoelectric receiving module through the polarized beam splitting prism after the second polarized light component of the +1-order diffracted light and the second polarized light component of the −1-order diffracted light become the S polarized light.

S3: receiving the +1-order diffracted light and the −1-order diffracted light through the photoelectric receiving module, interfering the second polarized light component of the −1-order diffracted light with the first polarized light component of the +1-order diffracted light to form a beat frequency signal having a frequency of $f_B$-$f_A$, and interfering the first polarized light component of the −1-order diffracted light with the second polarized light component of the +1-order diffracted light to form a beat frequency signal having a frequency of $f_B$-$f_A$.

The photoelectric receiving module includes a first receiver and a second receiver. The first receiver receives the second polarized light component of the −1-order diffracted light and the first polarized light component of the +1-order diffracted light, the second polarized light component of the −1-order diffracted light and the first polarized light component of the +1-order diffracted light interfere with each other to generate a first beat frequency signal having a frequency of $f_B$-$f_A$, and the first beat frequency signal is transmitted to the signal processing system. The second receiver receives the first polarized light component of the −1-order diffracted light and the second polarized light component of the +1-order diffracted light, the first polarized light component of the −1-order diffracted light and the second polarized light component of the +1-order diffracted light interfere with each other to generate a second beat frequency signal having a frequency of $f_B$-$f_A$, and the second beat frequency signal is transmitted to the signal processing system.

When the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$−2Δf, and the frequency of the beat frequency signal generated by the second receiver becomes $f_B$-$f_A$+2Δf.

S4: performing differential calculation on two paths of the beat frequency signals through a signal processing system to realize a displacement measurement of single diffraction of the one-dimensional measuring grating for the four-fold optical subdivision.

The signal processing system performs differential calculation on the first beat frequency signal generated by the first receiver and the second beat frequency signal generated by the second receiver to realize a displacement measurement of the single diffraction of the one-dimensional measuring grating for the four-fold optical subdivision. Since the differential calculation is already in the prior art, the details are not described herein.

In order to achieve higher optical subdivision, the +1-order diffracted light and the −1-order diffracted light generated by the diffraction of the one-dimensional measuring grating may be respectively incident on the first right-angle prism and the second right-angle prism. The +1-order diffracted light and the −1-order diffracted light are performed secondary reflection through the first right-angle prism and the second right-angle prism. Two new beams of diffracted lights are incident on the surface of the one-dimensional measuring grating again at a diffracted exit angle, and the two new beams of diffracted lights are vertically incident on the polarized beam splitting prism. Through the secondary diffraction of the +1-order diffracted light and the −1-order diffracted light, multiple times of the optical subdivision are doubled, so that measurement resolution force is improved.

Embodiment 3

Figure 7:
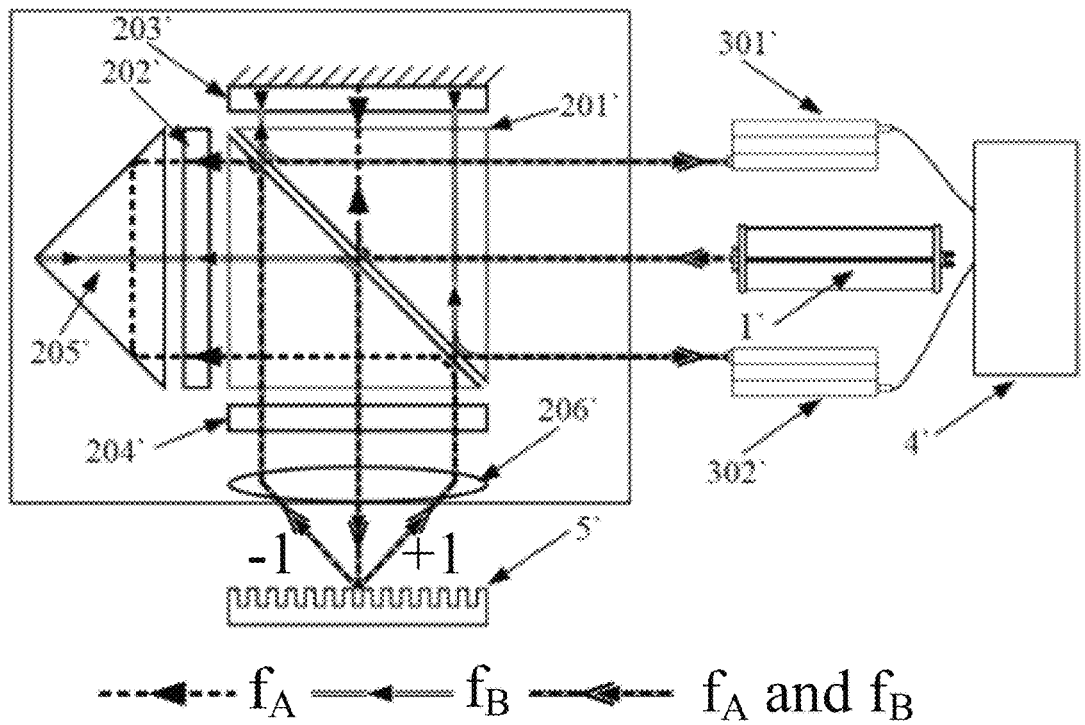
FIG. 7 is a principal schematic diagram of a heterodyne one-dimensional grating measuring device according to embodiment 3 of the present disclosure.
Figure 8:
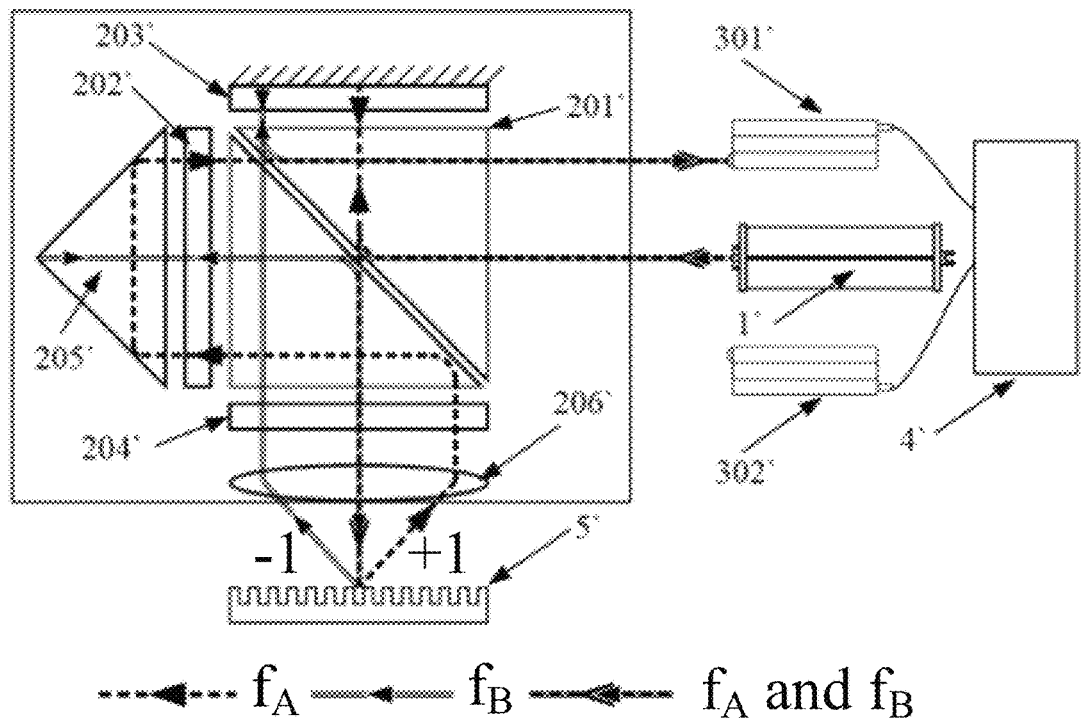
FIG. 8 is a principal schematic diagram of generating a first beat frequency signal according to embodiment 3 of the present disclosure.
Figure 9:
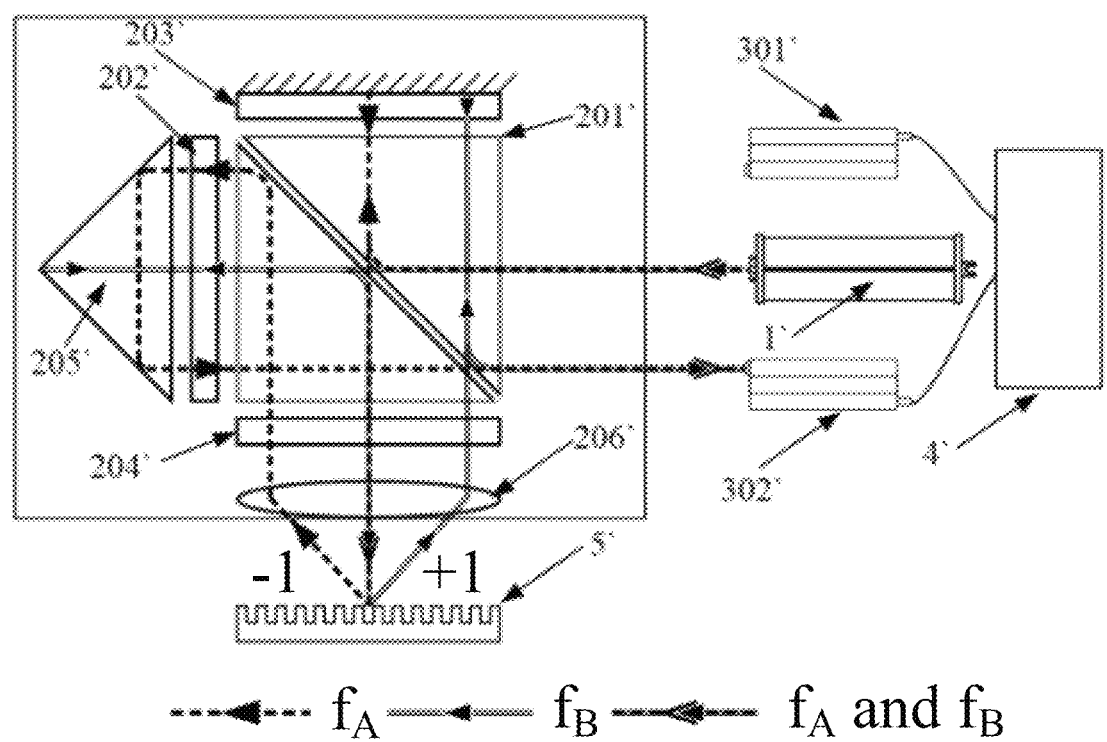
FIG. 9 is a principal schematic diagram of generating a second beat frequency signal according to embodiment 3 of the present disclosure.

As shown in FIGS. 7-9, embodiment 3 of the present disclosure provides another heterodyne one-dimensional grating measuring device, including a light source 1', a reading head 2', a photoelectric receiving module, and a signal processing system 4'. The light source 1' is configured to generate two beams of linearly polarized lights having characteristics of overlapping, polarization orthogonal, and fixed frequency difference as measuring light beams. The two beams of linearly polarized lights are respectively a first polarized light and a second polarized light, the first polarized light is S polarized light having a frequency of $f_A$, and the second polarized light is P polarized light having a frequency of $f_B$. The light source 1 may be a dual-frequency laser 1' or two lasers emitting a fixed frequency difference. The reading head is configured to incident the two beams of polarized lights on the surface of the moving one-dimensional measuring grating 5, the two beams of polarized lights generate a +1-order diffracted light and a −1-order diffracted light carrying measuring information after diffraction on the surface of the one-dimensional measuring grating 5. Both the +1-order diffracted light and the −1-order diffracted light include a first polarized light component and a second polarized light component. The first polarized light component and the second polarized light component of the +1-order diffracted light, and the first polarized light component and the second polarized light component of the −1-order diffracted light are respectively incident to the photoelectric receiving module through the reading head.

The reading head 2' includes a polarized beam splitting prism 201', a first quarter wave plate 202', a second quarter wave plate plated with a reflecting film 203', a third quarter wave plate 204', a reflecting prism 205', and a refracting element 206'. The polarized beam splitting prism 201' is disposed on an emergent light path of the light source 1', the refracting element 206' is disposed on a diffracted light path of the one-dimensional measuring grating 5, the first quarter wave plate 202' is disposed on a transmission light path of the polarized beam splitting prism 201', the second quarter wave plate 203' is disposed on a reflected light path of the polarized beam splitting prism 201', the third quarter wave plate 204' is disposed on a transmission light path of the refracting element 206', and the reflecting prism 205' is disposed on a transmission light path of the first quarter wave plate 202'.

The polarized beam splitting prism 201' receives the first polarized light and the second polarized light, transmits the second polarized light to the first quarter wave plate 202', and reflects the first polarized light to the second quarter wave plate 203'. The first quarter wave plate 202' converts the second polarized light into right-handed polarized light, and then the right-handed polarized light is incident to the reflecting prism 205'. The reflecting prism 205' reflects the second polarized light, so that the second polarized light passes through the first quarter wave plate 202' to become S polarized light and then returns to the polarized beam splitting prism 201'. The second quarter wave plate 203' converts the first polarized light into left-handed polarized light, the left-handed polarized light is reflected through the reflecting film, passes through the second quarter wave plate 203' again to become P polarized light, and then returns to the polarized beam splitting prism 203'. The polarized beam splitting prism 201' further transmits the first polarized light after the first polarized light becomes the P polarized light, reflects the second polarized light after the second polarized light becomes the S polarized light, so that the first polarized light and the second polarized light are combined into one beam to be incident on the surface of the one-dimensional measuring grating 5, and the one beam combined of the first polarized light and the second polarized light is diffracted to generate the −1-order diffracted light and the +1-order diffracted light. The refracting element 206' turns the −1-order diffracted light and the +1-order diffracted light, so that the −1-order diffracted light and the +1-order diffracted light are parallel to each other and are vertically incident to the third quarter wave plate 204'. The third quarter wave plate 204' converts the first polarized light component of the +1-order diffracted light and the first polarized light component of the −1-order diffracted light into the S polarized light, and the S polarized light is vertically incident to the polarized beam splitting prism. The third quarter wave plate 204' further converts the second polarized light component of the +1-order diffracted light and the second polarized light component of the −1-order diffracted light into the P polarized light, and the P polarized light is vertically incident to the polarized beam splitting prism 201'. The polarized beam splitting prism 201' reflects the first polarized light component of the +1-order diffracted light and the first polarized light component of the −1-order diffracted light to the first quarter wave plate 202', and the polarized beam splitting prism 201' further transmits the second polarized light component of the +1-order diffracted light and the second polarized light component of the −1-order diffracted light to the second quarter wave plate 203'. The first quarter wave plate 202' converts the first polarized light component of the +1-order diffracted light and the first polarized light component of the −1-order diffracted light into the left-handed polarized light, and then the left-handed polarized light is incident to the reflecting prism 205'. The reflecting prism 205' respectively performs secondary reflection on the first polarized light component of the +1-order diffracted light and the first polarized light component of the −1-order diffracted light to the first quarter wave plate 202' to become the P polarized light. Then the P polarized light is incident to the polarized beam splitting prism 201' again and is transmitted to the photoelectric receiving module through the polarized beam splitting prism 201'. The second quarter wave plate 203' converts the second polarized light component of the +1-order diffracted light and the second polarized light component of the −1-order diffracted light into the right-handed polarized light, and then the right-handed polarized light is reflected through the reflecting film again and passes through the second quarter wave plate 203' to become the S polarized light. The S polarized light is incident to the polarized beam splitting prism 201' and then is reflected to the photoelectric receiving module through the polarized beam splitting prism 201'.

Due to a fact that both the first polarized light component of the −1-order diffracted light and the second polarized light component of the −1-order diffracted light pass through the reflecting prism 205' twice, and both the first polarized light component of the +1-order diffracted light and the second polarized light component of the +1-order diffracted light pass through the reflecting prism 205' twice, therefore, transmission optical paths of the first polarized light component of the −1-order diffracted light and the second polarized light component of the −1-order diffracted light are equal in the reading head, and the transmission optical paths of the first polarized light component of the +1-order diffracted light and the second polarized light component of the +1-order diffracted light are equal in the reading head. Based on above, two effects as follows are achieved.

First, it is ensured that an optical path difference of measuring light beams entering the photoelectric receiving module is a constant value.

Second, when an environment temperature of the heterodyne one-dimensional grating measuring device changes, optical path difference changes of the measuring light beam are consistent, so that the measuring light beam may not be influenced by thermal expansion and contraction of optical elements of the reading head, and measuring errors are not introduced.

The photoelectric receiving module includes the first receiver 301' and the second receiver 302'. The first receiver 301' is configured to receive the second polarized light component of the −1-order diffracted light and the first polarized light component of the +1-order diffracted light. After the second polarized light component of the −1-order diffracted light interferes with the first polarized light component of the +1-order diffracted light to form a first beat frequency signal having a frequency of $f_B-f_A$, the first receiver 301' transmits the first beat frequency signal to the signal processing system 4. The second receiver 302' is configured to receive the first polarized light component of the −1-order diffracted light and the second polarized light component of the +1-order diffracted light. After the first polarized light component of the −1-order diffracted light interferes with the second polarized light component of the +1-order diffracted light to form a second beat frequency signal having a frequency of $f_B-f_A$, the second receiver 302' transmits the second beat frequency signal to the signal processing system 4.

When the one-dimensional measuring grating 5 moves along a direction of a grating vector, due to Doppler frequency shift effect of the grating, the −1-order diffracted light undergoes negative frequency shift $-\Delta f$, the +1-order diffracted light undergoes forward frequency shift $+\Delta f$. Therefore, the frequency of the first beat frequency signal generated by the first receiver 301 becomes $f_B-f_A-2\Delta f$, and the frequency of the second beat frequency signal generated by the second receiver 302 becomes $f_B-f_A+2\Delta f$.

The signal processing system 4' is configured to receive two beat frequency signals sent by the first receiver 301' and the second receiver 302'. The signal processing system 4' is further configured to perform differential calculation on the two beat frequency signals to realize a displacement measurement of the single diffraction of the one-dimensional measuring grating for the four-fold optical subdivision. Since the differential calculation is already in the prior art, details are not described herein.

Embodiment 4

The embodiment 3 of the present disclosure shows another structure of the heterodyne one-dimensional grating measuring device. Corresponding to the heterodyne one-dimensional grating measuring device of the embodiment 3 of the present disclosure, embodiment 4 of the present disclosure provides a method for grating displacement measurement through using the heterodyne one-dimensional grating measuring device according to the embodiment 3.

FIG. 10 is a schematic flowchart of a heterodyne one-dimensional grating measuring method according to embodiment 4 of the present disclosure.

As shown in FIG. 10, the heterodyne one-dimensional grating measuring method according to Embodiment 4 of the present disclosure includes the following steps:

S1: generating two beams of linearly polarized lights having characteristics of overlapping, polarization orthogonal, and fixed frequency difference through a light source, where the two beams of linearly polarized lights are respectively a first polarized light having a frequency of $f_A$ and a second polarized light having a frequency of $f_B$, the first polarized light is S polarized light, and the second polarized light is P polarized light.

S2: respectively entering the first polarized light and the second polarized light into a reading head, refracting the first polarized light and the second polarized light through the reading head, and respectively incidenting the first polarized light and the second polarized light on a surface of a one-dimensional measuring grating to generate +1-order diffracted light and −1-order diffracted light. Both the +1-order diffracted light and the −1-order diffracted light include a first polarized light component and a second polarized light component, then respectively incidenting the +1-order diffracted light and the −1-order diffracted light to a photoelectric receiving module through the reading head.

The step S2 specifically includes the following steps:

S201': incidenting the first polarized light and the second polarized light to a polarized beam splitting prism of the reading head, transmitting the second polarized light to a first quarter wave plate of the reading head through the polarized beam splitting prism, and reflecting the first polarized light to a second quarter wave plate of the reading head through the polarized beam splitting prism.

S202': converting the second polarized light into right-handed polarized light through the first quarter wave plate, and then incidenting the right-handed polarized light to the reflecting prism; reflecting the second polarized light through the reflecting prism, so that the second polarized light passes through the first quarter wave plate to become S polarized light and then returns to the polarized beam splitting prism, converting the first polarized light into left-handed polarized light through the second quarter wave plate reflecting the left-handed polarized light through the reflecting film to pass through the second quarter wave plate again to become P polarized light, and then the P polarized light returns to the polarized beam splitting prism.

S203': transmitting the first polarized light through the polarized beam splitting prism after the first polarized light becomes the P polarized light, reflecting the second polarized light through the polarized beam splitting prism after the second polarized light becomes the S polarized light, so that the first polarized light and the second polarized light are combined into one beam to be incident on the surface of the one-dimensional measuring grating, and diffracting the one beam combined of the first polarized light and the second polarized light to generate the −1-order diffracted light and the +1-order diffracted light.

S204': refracting the −1-order diffracted light and the +1-order diffracted light through a refracting element of the reading head, so that the −1-order diffracted light and the +1-order diffracted light are parallel to each other and are vertically incident to a third quarter wave plate of the reading head.

S205': converting the first polarized light component of the +1-order diffracted light and the first polarized light component of the −1-order diffracted light into the S polarized light through the third quarter wave plate, and vertically incidenting the S polarized light to the polarized beam splitting prism, converting the second polarized light component of the +1-order diffracted light and the second polarized light component of the −1-order diffracted light into the P polarized light through the third quarter wave plate, and vertically incidenting the P polarized light to the polarized beam splitting prism.

S206': reflecting the first polarized light component of the +1-order diffracted light and the first polarized light component of the −1-order diffracted light to the first quarter wave plate through the polarized beam splitting prism, transmitting the second polarized light component of the +1-order diffracted light and the second polarized light component of the −1-order diffracted light to the second quarter wave plate through the polarized beam splitting prism.

S207': converting the first polarized light component of the +1-order diffracted light and the first polarized light component of the −1-order diffracted light into the left-handed polarized light through the first quarter wave plate, and then incidenting the left-handed polarized light to the reflecting prism, respectively performing secondary reflection on the first polarized light component of the +1-order diffracted light and the first polarized light component of the −1-order diffracted light to the first quarter wave plate to become the P polarized light through the reflecting prism, then incidenting the P polarized light to the polarized beam splitting prism again and transmitting the P polarized light to the photoelectric receiving module through the polarized beam splitting prism, converting the second polarized light component of the +1-order diffracted light and the second polarized light component of the −1-order diffracted light into the right-handed polarized light through the second quarter wave plate, then reflecting the right-handed polarized light through the reflecting film again and passing through the second quarter wave plate to become the S polarized light, and incidenting the S polarized light to the polarized beam splitting prism and then reflecting the S polarized light to the photoelectric receiving module through the polarized beam splitting prism.

Due to a fact that both the first polarized light component of the −1-order diffracted light and the second polarized light component of the −1-order diffracted light pass through the reflecting prism 205' twice, and both the first polarized light component of the +1-order diffracted light and the second polarized light component of the +1-order diffracted light both pass through the reflecting prism 205' twice, therefore, transmission optical paths of the first polarized light component of the −1-order diffracted light and the second polarized light component of the −1-order diffracted light are equal in the reading head, and the transmission optical paths of the first polarized light component of the +1-order diffracted light and the second polarized light component of the +1-order diffracted light are equal in the reading head. Two effects are achieved:

First, it is ensured that an optical path difference of measuring light beams entering the photoelectric receiving module is a constant value.

Second, when an environment temperature of the heterodyne one-dimensional grating measuring device changes, optical path difference changes of the measuring light beam are consistent, so that the measuring light beam may not be influenced by thermal expansion and contraction of optical elements of the reading head, and measuring errors are not introduced.

S3: receiving the +1-order diffracted light and the −1-order diffracted light through the photoelectric receiving module, interfering the second polarized light component of the −1-order diffracted light with the first polarized light component of the +1-order diffracted light to form a beat frequency signal having a frequency of $f_B$-$f_A$, and interfering the first polarized light component of the −1-order diffracted light with the second polarized light component of the +1-order diffracted light to form a beat frequency signal having a frequency of $f_B$-$f_A$.

The photoelectric receiving module includes a first receiver and a second receiver. The first receiver receives the second polarized light component of the −1-order diffracted light and the first polarized light component of the +1-order diffracted light, generates a beat frequency signal having a frequency of $f_B$-$f_A$, and transmits the beat frequency signal to the signal processing system. The second receiver receives the first polarized light component of the −1-order diffracted light and the second polarized light component of the +1-order diffracted light, generates a beat frequency signal having a frequency of $f_B$-$f_A$, and transmits the beat frequency signal to the signal processing system.

When the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$−2Δf, and the frequency of the beat frequency signal generated by the second receiver becomes $f_B$-$f_A$+2Δf.

In order to achieve higher optical subdivision, the +1-order diffracted light and the −1-order diffracted light generated by the diffraction of the one-dimensional measuring grating may be respectively incident on the first right-angle prism and the second right-angle prism. The +1-order diffracted light and the −1-order diffracted light are performed secondary reflection through the first right-angle prism and the second right-angle prism. Two new beams of diffracted lights are incident on the surface of the one-dimensional measuring grating again at a diffracted exit angle, and the two new beams of diffracted lights are vertically incident on the polarized beam splitting prism. Through the secondary diffraction of the +1-order diffracted light and the −1-order diffracted light, multiple times of the optical subdivision are doubled, so that measurement resolution force is improved.

S4: performing differential calculation on two paths of the beat frequency signals through a signal processing system to realize a displacement measurement of single diffraction of the one-dimensional measuring grating for four-fold optical subdivision.

The signal processing system performs differential calculation on the first beat frequency signal generated by the first receiver and the second beat frequency signal generated by the second receiver to realize a displacement measurement of the single diffraction of the one-dimensional measuring grating for the four-fold optical subdivision. Since the differential calculation is already in the prior art, the details are not described herein.

In description of the present disclosure, the description with reference to terms "one embodiment", "some embodiments", "example", "specific example", or "some examples", etc., means that a particular feature, structure, material or characteristic described in connection with the embodiment or example is included in at least one embodiment or example of the present disclosure. In the specification of the present disclosure, schematic representations of the above terms are not necessarily directed to the same embodiment or example. Furthermore, the particular features, structures, materials or characteristics described may be combined in any suitable manner in any one or more embodiments or examples. In addition, different embodiments or examples and features of different embodiments or examples described in the specification may be combined and composed by those skilled in the art without contradiction.

Although the embodiments of the present disclosure have been shown and described above, it should be understood that the above embodiments are exemplary and should not be construed as limiting the present disclosure, and those skilled in the art may make variations, modifications, substitutions, and variations to the above embodiments within the scope of the present disclosure.

The specific embodiments of the present disclosure do not constitute a limitation on a protection scope of the present disclosure. Any other corresponding change and deformation made according to a technical concept of the present disclosure should be included in the protection scope of claims of the present disclosure.

What is claimed is:

1. A heterodyne one-dimensional grating measuring device, comprising:
   a light source;
   a reading head;
   a photoelectric receiving module; and
   a signal processing device;
   wherein the light source is configured to generate two beams of linearly polarized light having characteristics of overlapping, polarization orthogonal, and fixed frequency difference; the two beams of linearly polarized light are respectively a first polarized light having a frequency of $f_A$ and a second polarized light having a frequency of $f_B$, the first polarized light is a first S polarized light, and the second polarized light is a first P polarized light;
   the reading head is configured to receive the first polarized light and the second polarized light, the first polarized light and the second polarized light are respectively incident on a surface of a moving one-dimensional measuring grating to generate a +1-order diffracted light and a −1-order diffracted light, both the +1-order diffracted light and the −1-order diffracted light comprise a first polarized light component and a second polarized light component, the +1-order diffracted light and the −1-order diffracted light are respectively incident to the photoelectric receiving module through the reading head;
   the photoelectric receiving module is configured to receive the +1-order diffracted light and the −1-order diffracted light to form two paths of beat frequency signals; wherein one path is a beat frequency signal having a frequency of $f_B$-$f_A$ where the beat frequency having the frequency of $f_B$-$f_A$ is formed by interfering the second polarized light component of the −1-order diffracted light with the first polarized light component of the +1-order diffracted light; another path is a beat frequency signal having a frequency of $f_B$-$f_A$ where the beat frequency signal having the frequency of $f_B$-$f_A$ is formed by interfering the first polarized light component of the −1-order diffracted light with the second polarized light component of the +1-order diffracted light; and
   the signal processing device is configured to perform differential calculation on the two paths of the beat frequency signals to realize a displacement measurement of single diffraction of the one-dimensional measuring grating for four-fold optical subdivision.

2. The heterodyne one-dimensional grating measuring device according to claim 1, wherein the reading head comprises a reflecting mirror, a polarized beam splitting prism, a first quarter wave plate, a second quarter wave plate, a compensating mirror plated with a reflecting film, a reflecting prism, and a refracting lens;
   wherein the reflecting mirror is disposed on an emergent light path of the light source, the reflecting mirror is configured to vertically reflect the first polarized light and the second polarized light to the surface of the one-dimensional measuring grating, so as to generate the +1-order diffracted light and the −1-order diffracted light;
   the refracting lens is disposed on a diffracted light path of the one-dimensional measuring grating, the refracting lens is configured to refract the +1-order diffracted light and the −1-order diffracted light, so that the +1-order diffracted light and the −1-order diffracted light are parallel to each other and are vertically incident to the polarized beam splitting prism;
   the polarized beam splitting prism is disposed on a transmission light path of the refracting element, the polarized beam splitting prism is configured to respectively reflect the first polarized light component of the +1-order diffracted light and the first polarized light component of the −1-order diffracted light to the first quarter wave plate, the polarized beam splitting prism is further configured to respectively transmit the second polarized light component of the +1-order diffracted light and the second polarized light component of the −1-order diffracted light to the second quarter wave plate;
   the first quarter wave plate is disposed on a reflected light path of the polarized beam splitting prism, the first quarter wave plate is configured to respectively convert the first polarized light component of the +1-order diffracted light and the first polarized light component of the −1-order diffracted light into left-handed polarized light, then the left-handed polarized light is incident to the reflecting prism;
   the reflecting prism is disposed on a transmission light path of the first quarter wave plate, the reflecting prism is configured to respectively perform secondary reflection on the first polarized light component of the +1-order diffracted light and the first polarized light component of the −1-order diffracted light, so that the first polarized light component of the +1-order diffracted light and the first polarized light component of the −1-order diffracted light become a second P polarized light after passing through the first quarter wave plate, then the second P polarized light is incident to the polarized beam splitting prism;

the second quarter plate is disposed on a transmission light path of the polarized beam splitting prism, the second quarter plate is configured to respectively convert the second polarized light component of the +1-order diffracted light and the second polarized light component of the −1-order diffracted light into right-handed polarized light, then the right-handed polarized light is incident to the compensating mirror;

the compensating mirror is disposed on a transmission light path of the second quarter wave plate, the compensating mirror is configured to reflect the second polarized light component of the +1-order diffracted light and the second polarized light component of the −1-order diffracted light, so that the second polarized light component of the +1-order diffracted light and the second polarized light component of the −1-order diffracted light become a second S polarized light after passing through the second quarter wave plate, then the second S polarized light is incident to the polarized beam splitting prism;

the polarized beam splitting prism is further configured to transmit the first polarized light component of the +1-order diffracted light and the first polarized light component of the −1-order diffracted light to the photoelectric receiving module after the first polarized light component of the +1-order diffracted light and the first polarized light component of the −1-order diffracted light become the second P polarized light, and the polarized beam splitting prism is further configured to reflect the second polarized light component of the +1-order diffracted light and the second polarized light component of the −1-order diffracted light to the photoelectric receiving module after the second polarized light component of the +1-order diffracted light and the second polarized light component of the −1-order diffracted light become the second S polarized light.

3. The heterodyne one-dimensional grating measuring device according to claim 2, wherein the photoelectric receiving module comprises a first receiver and a second receiver; the first receiver is configured to receive the second polarized light component of the −1-order diffracted light and the first polarized light component of the +1-order diffracted light, generate a beat frequency signal having a frequency of $f_B$-$f_A$, and transmit the beat frequency signal to the signal processing device; and the second receiver is configured to receive the first polarized light component of the −1-order diffracted light and the second polarized light component of the +1-order diffracted light, generate a beat frequency signal having a frequency of $f_B$-$f_A$, and transmit the beat frequency signal to the signal processing device.

4. The heterodyne one-dimensional grating measuring device according to claim 3, wherein when the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$−2Δf, and the frequency of the beat frequency signal generated by the second receiver becomes $f_B$-$f_A$+2Δf.

5. The heterodyne one-dimensional grating measuring device according to claim 2, wherein a thickness of the compensating mirror is equal to ½ length of the reflecting prism, the compensating mirror is configured to compensate a transmission optical path of the second polarized light component of the +1-order diffracted light and the second polarized light component of the −1-order diffracted light, so that the transmission optical path of the second polarized light component of the +1-order diffracted light and the second polarized light component of the −1-order diffracted light is equal to a transmission optical path of the first polarized light component of the +1-order diffracted light and the first polarized light component of the −1-order diffracted light.

6. The heterodyne one-dimensional grating measuring device according to claim 2, wherein the reading head further comprises a first right-angle prism and a second right-angle prism, the first right-angle prism and the second right-angle prism are respectively disposed on the diffracted light path of the one-dimensional measuring grating, the first right-angle prism and the second right-angle prism respectively perform secondary reflection on the +1-order diffracted light and the −1-order diffracted light, so that the +1-order diffracted light and the −1-order diffracted light are incident on the surface of the one-dimensional measuring grating again at a diffracted exit angle; and two beams of new diffracted light are vertically incident to the polarized beam splitting prism.

7. The heterodyne one-dimensional grating measuring device according to claim 1, wherein the reading head comprises a polarized beam splitting prism, a first quarter wave plate, a second quarter wave plate plated with a reflecting film and a reflecting prism;

the polarized beam splitting prism is disposed on an emergent light path of the light source, the polarized beam splitting prism is configured to receive the first polarized light and the second polarized light, transmit the second polarized light to the first quarter wave plate, and reflect the first polarized light to the second quarter wave plate;

the first quarter wave plate is disposed on a transmission light path of the polarized beam splitting prism, the first quarter wave plate is configured to convert the second polarized light into right-handed polarized light, then the right-handed polarized light is incident to the reflecting prism;

the reflecting prism is disposed on a transmission light path of the first quarter wave plate, the reflecting prism is configured to reflect the second polarized light, so that the second polarized light passes through the first quarter wave plate to become a third S polarized light and then returns to the polarized beam splitting prism;

the second quarter wave plate is disposed on a reflected light path of the polarized beam splitting prism, the second quarter wave plate is configured to convert the first polarized light into left-handed polarized light, the left-handed polarized light is reflected through the reflecting film, then passes through the second quarter wave plate again to become a third P polarized light, and then returns to the polarized beam splitting prism; and the polarized beam splitting prism is further configured to transmit the first polarized light after the first polarized light becomes the third P polarized light, reflect the second polarized light after the second polarized light becomes the third S polarized light, so that the first polarized light and the second polarized light are combined into one beam to be incident on the surface of the one-dimensional measuring grating, and the one beam combined of the first polarized light and the second polarized light is diffracted to generate the −1-order diffracted light and the +1-order diffracted light.

8. The heterodyne one-dimensional grating measuring device according to claim 7, wherein the reading head further comprises a refracting lens and a third quarter wave plate;

wherein the refracting lens is disposed on a diffracted light path of the one-dimensional measuring grating, the refracting lens is configured to refract the −1-order diffracted light and the +1-order diffracted light, so that the −1-order diffracted light and the +1-order diffracted light are parallel to each other and are vertically incident to the third quarter wave plate;

the third quarter wave plate is disposed on a transmission light path of the refracting element, the third quarter wave plate is configured to convert the first polarized light component of the +1-order diffracted light and the first polarized light component of the −1-order diffracted light into the third S polarized light, the third S polarized light is vertically incident to the polarized beam splitting prism; the third quarter wave plate is further configured to convert the second polarized light component of the +1-order diffracted light and the second polarized light component of the −1-order diffracted light into the third P polarized light, the third P polarized light is vertically incident to the polarized beam splitting prism;

the polarized beam splitting prism is configured to reflect the first polarized light component of the +1-order diffracted light and the first polarized light component of the −1-order diffracted light to the first quarter wave plate; the polarized beam splitting prism is further configured to transmit the second polarized light component of the +1-order diffracted light and the second polarized light component of the −1-order diffracted light to the second quarter wave plate;

the first quarter wave plate is configured to convert the first polarized light component of the +1-order diffracted light and the first polarized light component of the −1-order diffracted light into the left-handed polarized light, then the left-handed polarized light is incident to the reflecting prism;

the reflecting prism is configured to perform secondary reflection on the first polarized light component of the +1-order diffracted light and the first polarized light component of the −1-order diffracted light to the first quarter wave plate to become a fourth P polarized light, then the fourth P polarized light is incident to the polarized beam splitting prism again and is transmitted to the photoelectric receiving module through the polarized beam splitting prism;

the second quarter wave plate is configured to convert the second polarized light component of the +1-order diffracted light and the second polarized light component of the −1-order diffracted light into the right-handed polarized light, then the right-handed polarized light is reflected through the reflecting film again and passes through the second quarter wave plate to become a fourth S polarized light, and the fourth S polarized light is incident to the polarized beam splitting prism and then is reflected to the photoelectric receiving module through the polarized beam splitting prism.

9. The heterodyne one-dimensional grating measuring device according to claim 8, wherein the photoelectric receiving module comprises a first receiver and a second receiver; the first receiver is configured to receive the first polarized light component of the +1-order diffracted light and the second polarized light component of the −1-order diffracted light, generate a beat frequency signal having a frequency of $f_B$-$f_A$, and transmit the beat frequency signal to the signal processing device; and the second receiver is configured to receive the first polarized light component of the −1-order diffracted light and the second polarized light component of the +1-order diffracted light, generate a beat frequency signal having a frequency of $f_B$-$f_A$, and transmit the beat frequency signal to the signal processing device.

10. The heterodyne one-dimensional grating measuring device according to claim 9, wherein when the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$-2Δf, and the frequency of the beat frequency signal generated by the second receiver becomes $f_B$-$f_A$+2Δf.

11. The heterodyne one-dimensional grating measuring device according to claim 7, wherein a transmission optical path of the first polarized light component of the −1-order diffracted light is equal to a transmission optical path of the second polarized light component of the −1-order diffracted light, and a transmission optical path of the first polarized light component of the +1-order diffracted light is equal to a transmission optical path of the second polarized light component of the +1-order diffracted light.

12. The heterodyne one-dimensional grating measuring device according to claim 7, wherein the reading head further comprises a first right-angle prism and a second right-angle prism, the first right-angle prism and the second right-angle prism are respectively disposed on the diffracted light path of the one-dimensional measuring grating, the first right-angle prism and the second right-angle prism respectively perform secondary reflection the +1-order diffracted light and the −1-order diffracted light, the +1-order diffracted light and the −1-order diffracted light are incident on the surface of the one-dimensional measuring grating again at a diffracted exit angle; and two beams of new diffracted light are vertically incident to the polarized beam splitting prism.

13. A heterodyne one-dimensional grating measuring method, comprising following steps:

S1: generating two beams of linearly polarized light having characteristics of overlapping, polarization orthogonal, and fixed frequency difference through a light source, where the two beams of linearly polarized light are respectively a first polarized light having a frequency of $f_A$ and a second polarized light having a frequency of $f_B$, the first polarized light is a first S polarized light, and the second polarized light is a first P polarized light;

S2: respectively entering the first polarized light and the second polarized light into a reading head, refracting the first polarized light and the second polarized light through the reading head, and respectively incidenting the first polarized light and the second polarized light on a surface of an one-dimensional measuring grating to generate +1-order diffracted light and −1-order diffracted light where both the +1-order diffracted light and the −1-order diffracted light comprise a first polarized light component and a second polarized light component; then respectively incidenting the +1-order diffracted light and the −1-order diffracted light to a photoelectric receiving module through the reading head;

S3: receiving the +1-order diffracted light and the −1-order diffracted light through the photoelectric receiving module, interfering the second polarized light component of the −1-order diffracted light with the first polarized light component of the +1-order diffracted light to form a beat frequency signal having a frequency of $f_B$-$f_A$, and interfering the first polarized light component of the −1-order diffracted light with the second polarized light component of the +1-order diffracted light to form a beat frequency signal having a frequency of $f_B$-$f_A$;

S4: performing differential calculation on two paths of the beat frequency signals through a signal processing device to realize a displacement measurement of single diffraction of the one-dimensional measuring grating for four-fold optical subdivision.

14. The heterodyne one-dimensional grating measuring method according to claim 13, wherein the step S2 comprises the following steps:

S201: vertically reflecting the first polarized light and the second polarized light to the surface of the one-dimensional measuring grating through a reflecting mirror of the reading head, then generating the +1-order diffracted light and the −1-order diffracted light;

S202: refracting the +1-order diffracted light and the −1-order diffracted light through a refracting lens of the reading head, so that the +1-order diffracted light and the −1-order diffracted light are parallel to each other and are vertically incident to a polarized beam splitting prism of the reading head;

S203: respectively reflecting the first polarized light component of the +1-order diffracted light and the first polarized light component of the −1-order diffracted light to a first quarter wave plate of the reading head through the polarized beam splitting prism; and respectively transmitting the second polarized light component of the +1-order diffracted light and the second polarized light component of the −1-order diffracted light to a second quarter wave plate of the reading head through the polarized beam splitting prism;

S204: respectively converting the first polarized light component of the +1-order diffracted light and the first polarized light component of the −1-order diffracted light into left-handed polarized light, then incidenting the left-handed polarized light to a reflecting prism of the reading head; performing secondary reflection on the first polarized light component of the +1-order diffracted light and the first polarized light component of the −1-order diffracted light through the reflecting prism, so that the first polarized light component of the +1-order diffracted light and the first polarized light component of the −1-order diffracted light become a second P polarized light after passing through the first quarter wave plate, then incidenting the second P polarized light to the polarized beam splitting prism; respectively converting the second polarized light component of the +1-order diffracted light and the second polarized light component of the −1-order diffracted light into right-handed polarized light through the second quarter plate, then incidenting the right-handed polarized light to a compensating mirror of the reading head; reflecting the second polarized light component of the +1-order diffracted light and the second polarized light component of the −1-order diffracted light through the compensating mirror, so that the second polarized light component of the +1-order diffracted light and the second polarized light component of the −1-order diffracted light become a second S polarized light after passing through the second quarter wave plate, then incidenting the second S polarized light to the polarized beam splitting prism;

S205: transmitting the first polarized light component of the +1-order diffracted light and the first polarized light component of the −1-order diffracted light to the photoelectric receiving module through the polarized beam splitting prism after the first polarized light component of the +1-order diffracted light and the first polarized light component of the −1-order diffracted light become the second P polarized light, and reflecting the second polarized light component of the +1-order diffracted light and the second polarized light component of the −1-order diffracted light to the photoelectric receiving module through the polarized beam splitting prism after the second polarized light component of the +1-order diffracted light and the second polarized light component of the −1-order diffracted light become the second S polarized light.

15. The heterodyne one-dimensional grating measuring method according to claim 14, wherein a thickness of the compensating mirror is equal to ½ length of the reflecting prism, the compensating mirror is configured to compensate a transmission optical path of the second polarized light component of the +1-order diffracted light and the second polarized light component of the −1-order diffracted light, so that the transmission optical path of the second polarized light component of the +1-order diffracted light and the second polarized light component of the −1-order diffracted light is equal to a transmission optical path of the first polarized light component of the +1-order diffracted light and the first polarized light component of the −1-order diffracted light.

16. The heterodyne one-dimensional grating measuring method according to claim 14, wherein the photoelectric receiving module comprises a first receiver and a second receiver; the first receiver receives the second polarized light component of the −1-order diffracted light and the first polarized light component of the +1-order diffracted light, generates a beat frequency signal having a frequency of $f_B$-$f_A$, and transmits the beat frequency signal to the signal processing device; and the second receiver receives the first polarized light component of the −1-order diffracted light and the second polarized light component of the +1-order diffracted light, generates a beat frequency signal having a frequency of $f_B$-$f_A$, and transmits the beat frequency signal to the signal processing device.

17. The heterodyne one-dimensional grating measuring method according to claim 16, wherein when the one-dimensional measuring grating moves along a direction of a grating vector, the −1-order diffracted light undergoes negative frequency shift −Δf, the +1-order diffracted light undergoes forward frequency shift +Δf, the frequency of the beat frequency signal generated by the first receiver becomes $f_B$-$f_A$−2Δf, and the frequency of the beat frequency signal generated by the second receiver becomes $f_B$-$f_A$+2Δf.

18. The heterodyne one-dimensional grating measuring method according to claim 14, wherein the +1-order diffracted light and the −1-order diffracted light generated by the diffraction of the one-dimensional measuring grating are respectively incident to a first right-angle prism and a second right-angle prism; the first right-angle prism and the second right-angle prism respectively perform secondary reflection on the +1-order diffracted light and the −1-order diffracted light, so that the +1-order diffracted light and the −1-order diffracted light are incident on the surface of the one-dimensional measuring grating again at a diffracted exit angle; and two beams of new diffracted light are vertically incident to the polarized beam splitting prism.

19. The heterodyne one-dimensional grating measuring method according to claim 13, wherein the step S2 specifically comprises the following steps:
S201': incidenting the first polarized light and the second polarized light to a polarized beam splitting prism of the reading head, transmitting the second polarized light to a first quarter wave plate of the reading head through the polarized beam splitting prism, and reflecting the first polarized light to a second quarter wave plate of the reading head through the polarized beam splitting prism;
S202': converting the second polarized light into right-handed polarized light through the first quarter wave plate, then incidenting the right-handed polarized light to the reflecting prism; reflecting the second polarized light through a reflecting prism, so that the second polarized light passes through the first quarter wave plate to become a third S polarized light and then returns to the polarized beam splitting prism; converting the first polarized light into left-handed polarized light through the second quarter wave plate, reflecting the left-handed polarized light through the reflecting film to pass through the second quarter wave plate again to become a third P polarized light, and then the third P polarized light returns to the polarized beam splitting prism;
S203': further transmitting the first polarized light through the polarized beam splitting prism after the first polarized light becomes the third P polarized light, reflecting the second polarized light through the polarized beam splitting prism after the second polarized light becomes the third S polarized light, so that the first polarized light and the second polarized light are combined into one beam to be incident on the surface of the one-dimensional measuring grating, and diffracting the one beam combined of the first polarized light and the second polarized light to generate the −1-order diffracted light and the +1-order diffracted light;
S204': refracting the −1-order diffracted light and the +1-order diffracted light through a refracting lens of the reading head, so that the −1-order diffracted light and the +1-order diffracted light are parallel to each other and are vertically incident to a third quarter wave plate of the reading head;
S205': converting the first polarized light component of the +1-order diffracted light and the first polarized light component of the −1-order diffracted light into a fourth S polarized light through the third quarter wave plate, vertically incidenting the fourth S polarized light to the polarized beam splitting prism; converting the second polarized light component of the +1-order diffracted light and the second polarized light component of the −1-order diffracted light into a fourth P polarized light through the third quarter wave plate, vertically incidenting the fourth P polarized light to the polarized beam splitting prism;
S206': reflecting the first polarized light component of the +1-order diffracted light and the first polarized light component of the −1-order diffracted light to the first quarter wave plate through the polarized beam splitting prism; transmitting the second polarized light component of the +1-order diffracted light and the second polarized light component of the −1-order diffracted light to the second quarter wave plate through the polarized beam splitting prism;
S207': converting the first polarized light component of the +1-order diffracted light and the first polarized light component of the −1-order diffracted light into the left-handed polarized light through the first quarter wave plate, then incidenting the left-handed polarized light to the reflecting prism; performing secondary reflection on the first polarized light component of the +1-order diffracted light and the first polarized light component of the −1-order diffracted light to the first quarter wave plate to become a fifth P polarized light through the reflecting prism, then incidenting the fifth P polarized light to the polarized beam splitting prism again and transmitting the fifth P polarized light to the photoelectric receiving module through the polarized beam splitting prism; converting the second polarized light component of the +1-order diffracted light and the second polarized light component of the −1-order diffracted light into the right-handed polarized light through the second quarter wave plate, then reflecting the right-handed polarized light through the reflecting film again and passing through the second quarter wave plate to become a fifth S polarized light, and incidenting the fifth S polarized light to the polarized beam splitting prism and then reflecting the S polarized light to the photoelectric receiving module through the polarized beam splitting prism.

20. The heterodyne one-dimensional grating measuring method according to claim 19, wherein a transmission optical path of the first polarized light component of the −1-order diffracted light is equal to a transmission optical path of the second polarized light component of the −1-order diffracted light, a transmission optical path of the first polarized light component of the +1-order diffracted light is equal to a transmission optical path of the second polarized light component of the +1-order diffracted light.

* * * * *